United States Patent
Reina et al.

(10) Patent No.: US 10,769,120 B2
(45) Date of Patent: Sep. 8, 2020

(54) SYSTEMS AND METHODS FOR DYNAMICALLY UPDATING A USER INTERFACE

(71) Applicant: Zinatt Technologies Inc., Indianapolis, IN (US)

(72) Inventors: Gabriel Enrique Reina, Tucson, AZ (US); Thomas Ray Hershberger, Indianapolis, IN (US)

(73) Assignee: Zinatt Technologies Inc., Tucson, AZ (US)

( * ) Notice: Subject to any disclaimer, the term of this patent is extended or adjusted under 35 U.S.C. 154(b) by 194 days.

(21) Appl. No.: 16/112,695

(22) Filed: Aug. 25, 2018

(65) Prior Publication Data
US 2020/0065404 A1    Feb. 27, 2020

(51) Int. Cl.
*G06F 16/21* (2019.01)
*G06F 9/451* (2018.01)
*G06F 3/0485* (2013.01)
*G06F 3/0481* (2013.01)
*G06F 3/0483* (2013.01)
(Continued)

(52) U.S. Cl.
CPC ............ *G06F 16/21* (2019.01); *G06F 3/0481* (2013.01); *G06F 3/0482* (2013.01); *G06F 3/0483* (2013.01); *G06F 3/0485* (2013.01); *G06F 9/451* (2018.02); *G06F 16/252* (2019.01)

(58) Field of Classification Search
CPC .............................. G06F 3/0481; G06F 16/21
See application file for complete search history.

(56) References Cited

U.S. PATENT DOCUMENTS 6,310,631 B1 * 10/2001 Cecco ................... G06F 3/0481
715/792
2018/0307730 A1   10/2018 Reina et al.

FOREIGN PATENT DOCUMENTS

WO    20171044697 A1    3/2017

OTHER PUBLICATIONS

U.S. Appl. No. 62/217,385, filed Sep. 11, 2015, entitled "Systems and Methods for Tracking Information" by Reina et al.
(Continued)

*Primary Examiner* — Etienne P Leroux
(74) *Attorney, Agent, or Firm* — Faegre Drinker Biddle & Reath LLP

(57) ABSTRACT

Disclosed herein are systems and methods for dynamically updating a user interface. One embodiment takes the form of a method that includes displaying, via a user interface of a computing device, a database-coordination workspace that includes a database-access area and a working area. The database-access area includes multiple selectable database-access elements that correspond to respective databases. Each database-access element is operable to display within the working area a database-management window for the corresponding database. The method also includes receiving, via the user interface, selections of the database-access elements, and responsively displaying a corresponding database-management window in the working area. When at least one database-management window is currently displayed in the working area, the working area is collectively fully occupied by the one or more currently displayed database-management windows, and each currently displayed database-management window initially occupies a predetermined respective fraction of the working area.

27 Claims, 38 Drawing Sheets

(51) Int. Cl.
*G06F 3/0482* (2013.01)
*G06F 16/25* (2019.01)

(56) References Cited

OTHER PUBLICATIONS

U.S. Appl. No. 62/232,724, filed Sep. 25, 2015, entitled "Systems and Methods for Tracking Information" by Reina et al.

\* cited by examiner

SYSTEMS AND METHODS FOR DYNAMICALLY UPDATING A USER INTERFACE

BACKGROUND

There are numerous contexts in which people, and often teams of people, need to keep track of numerous pieces of information in connection with an ongoing investigation or other project. Failure to do so effectively and efficiently can result in details being missed. In the context of law-enforcement investigations, the consequences of such failures can be quite serious.

OVERVIEW

Disclosed herein are systems and methods for dynamically updating a user interface. One embodiment takes the form of a method that includes displaying, via a user interface of a computing device, a database-coordination workspace that includes a database-access area and a working area. The database-access area includes multiple selectable database-access elements that correspond to respective databases. Each database-access element is operable to display within the working area a database-management window for the corresponding database. The method also includes receiving, via the user interface, selections of the database-access elements, and responsively displaying a corresponding database-management window in the working area. When at least one database-management window is currently displayed in the working area, the working area is collectively fully occupied by the one or more currently displayed database-management windows, and each currently displayed database-management window initially occupies a predetermined respective fraction of the working area.

Another embodiment takes the form of a system that includes a communication interface; a user interface; a processor; and data storage containing instructions executable by the processor for carrying out at least the functions described in the preceding paragraph. Yet another embodiment takes the form of a computer-readable medium having stored thereon instructions executable by the processor for carrying out at least those functions.

A number of variations and permutations of the above-listed embodiments are described herein. Moreover, it is expressly noted that any variation or permutation that is described in this disclosure can be implemented with respect to any type of embodiment. For example, a variation or permutation that is primarily described in connection with a method embodiment could just as well be implemented in connection with a system embodiment and/or a CRM embodiment. Furthermore, this flexibility and cross-applicability of embodiments is present in spite of any slightly different language (e.g., process, method, steps, functions, set of functions, and the like) that is used to describe and/or characterize such embodiments.

BRIEF DESCRIPTION OF THE DRAWINGS

A more detailed understanding may be had from the following description, which is presented by way of example in conjunction with the following drawings, in which like reference numerals are used across the drawings in connection with like elements.

Figure 1:
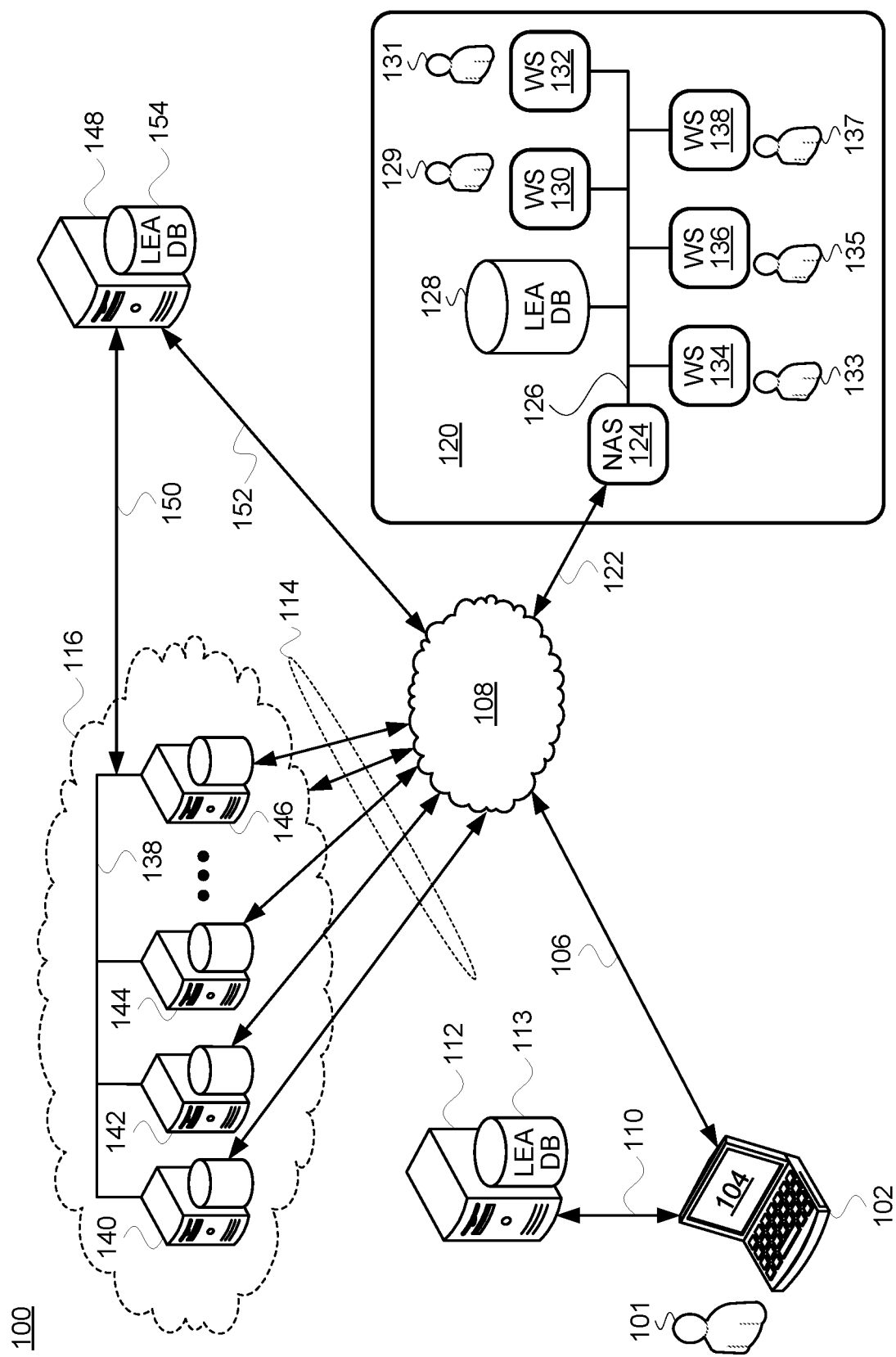
FIG. 1 depicts an example communication context that includes an example workstation, in accordance with at least one embodiment.

For the purposes of promoting an understanding of the principles of the present disclosure, reference is made below to the embodiments illustrated in the drawings, which are described below. The embodiments disclosed herein are not intended to be exhaustive or to limit the present disclosure to the precise form disclosed in the following detailed description. Rather, the embodiments are chosen and described so that others skilled in the art may utilize their teachings. Therefore, no limitation of the scope of the present disclosure is thereby intended.

In some instances throughout this disclosure and in the claims, numeric modifiers such as first, second, third, and fourth are used in reference to various components, data such as various identifiers, and/or other elements. Such use is not intended to denote or dictate a specific or required order of the elements. Rather, this numeric terminology is used to assist the reader in identifying the element that is being referenced and in distinguishing that element from other elements, and should not be narrowly interpreted as insisting upon any particular order.

Moreover, before proceeding with this detailed description, it is noted that the entities, arrangements, and the like that are depicted in—and described in connection with—the various drawings are presented by way of example and not by way of limitation. As such, any and all statements or other indications as to what a particular drawing "depicts," what a particular element or entity in a particular drawing "is" or "has," and any and all similar statements—that could in isolation and out of context be read as absolute and therefore limiting—can only properly be read as being constructively (unless actually) preceded by a clause such as "In at least one embodiment, . . . ." And it is for reasons akin to brevity and clarity of presentation that this implied leading clause is not repeated ad nauseum in this detailed description.

DETAILED DESCRIPTION OF THE DRAWINGS

The entire disclosure of each of the following patent applications is hereby incorporated herein by reference: U.S. Provisional Patent Application No. 62/217,385, filed Sep. 11, 2015 and now expired, entitled "Systems and Methods for Tracking Information;" U.S. Provisional Patent Application No. 62/232,724, filed Sep. 25, 2015 and now expired, entitled "Systems and Methods for Tracking Information;" International Patent Application No. PCT/US2016/050885, filed Sep. 9, 2016, published Mar. 16, 2017 under International Publication No. WO 2017/044697 A1, and entitled "Systems and Methods for Tracking Information;" and U.S. patent application Ser. No. 15/758,909, filed Mar. 9, 2018, entitled "Systems and Methods for Tracking Information."

FIG. 1 depicts an example communication context 100 in which embodiment of the present systems and methods could be carried out. The communication context 100 includes a computing system (e.g., a laptop computer) 102 associated with a user 101. The computing system 102 includes a display 104, and is communicatively connected via a communication link 110 with a server 112 that is associated with a law-enforcement-agency (LEA) database 113. The computing system 102 is also communicatively connected via a communication link 106 to a data network 108, which could be an IP-based network such as the Internet and/or one or more other private and/or public data networks. As used herein, a "communication link" includes one or more wired-communication (e.g., Ethernet, Universal Serial Bus (USB), and/or the like) links and/or one or more wireless-communication (e.g., LTE, Wi Fi, Bluetooth, and/or the like), and may also include any suitable number of relay devices such as routers, switches, bridges, and/or the like.

The communication context 100 also includes a cloud-based system 116 that is connected to the data network 108 via one or more communication links 114. The cloud-based system 116 includes multiple servers 140, 142, 144, and 146 and associated data stores, all of which communicate with one another via a LAN or other private network (e.g., VPN) 138. The communication context 100 also includes a server 148 having an associated LEA data store 154. The server 148 is connected to the cloud-based system 116 via a data link 150 and to the data network 108 via a communication link 152.

Furthermore, the communication context 100 includes an LEA facility 120 that includes a network access server (NAS) 124 via which the LEA facility 120 is connected to the data network via a communication link 122. The NAS may include VPN and firewall capabilities, among other functions. The NAS 124 is connected on an internal interface to a LAN 126. Also connected to the LAN 126 are an LEA database 128, a workstation 130 associated with a user 129, a workstation 132 associated with a user 131, a workstation 134 associated with a user 133, a workstation 136 associated with a user 135, and a workstation 139 associated with a user 137. Any number of workstations and any number of users could be present in various different situations. Also, the connections of the various workstations to the LAN 126 could be wired or wireless. Furthermore, workstations may not be permanently associated with particular users, as different users may be able to log in and out of various workstations and accordingly gain differing levels of access, visibility, read/write privileges, and/or the like, depending on their respective account configurations.

The present systems and methods that are described herein could be carried out using a computing system such as the computing system 102, one of the workstations 130-138, and/or any other device that is suitably equipped, programmed, and configured to be able to perform the functions described herein. By way of illustration, embodiments of the present systems and methods are described in connection with the ensuing figures according to an example in which a user is using the workstation 130 at the LEA facility 120. Further, although in various different embodiments the databases described herein could reside in any local and/or networked servers (e.g., one or more of the servers 140-146 in the cloud-based system 116, the present systems and methods are primarily described herein using an example scenario in which all of the described databases are resident on the LEA database 128. As such, the workstation 130 could have Internet connectivity via the NAS 124, but does not need to have it in order to carry out the present systems and methods.

Figure 2:
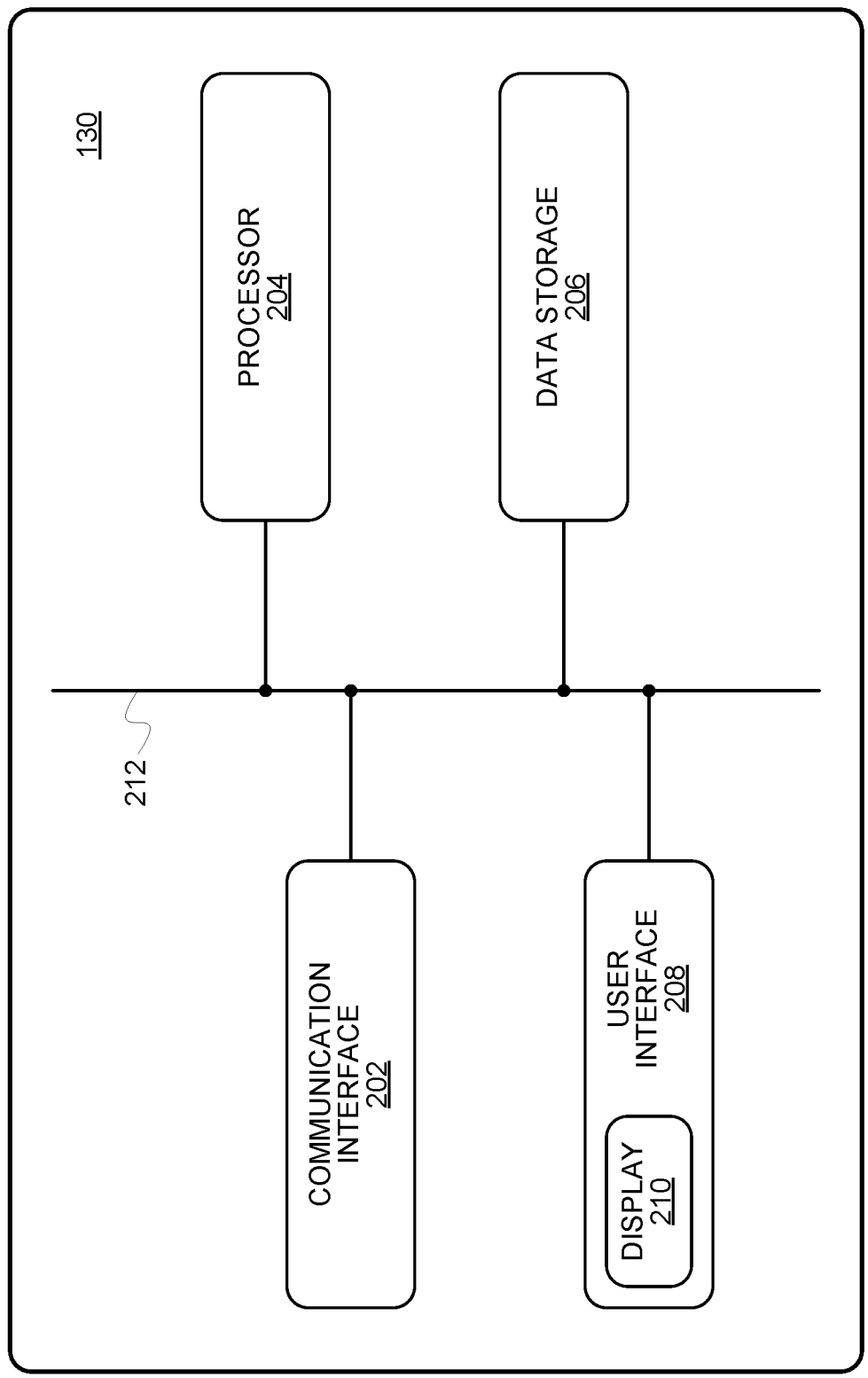
FIG. 2 depicts an example architecture of the example workstation of FIG. 1, in accordance with at least one embodiment.

FIG. 2 depicts an example architecture of the workstation 130. In FIG. 2, the workstation 130 includes a communication interface 202, a processor 204, a data storage 206, and a user interface 208 that includes a display 210, all of which are communicatively connected to one another via a system bus 212. The communication interface 202 could include one or more components such as Ethernet cards and/or the like for wired communication and/or one or more components such as Wi-Fi chips and/or the like for wireless communication. The processor 204 could be a general-purpose microprocessor such as a central processing unit (CPU). The data storage 206 could be or include any suitable non-transitory computer-readable medium (CRM) such as memory (e.g., read-only memory (ROM), random-access memory (RAM)), flash memory, a solid-state drive, and/or the like), and may contain instructions executable by the processor 204 for carrying out the functions described herein. The user interface 208, in addition to the display 210, may include one or more output devices such as speakers, indicator LEDs, and/or the like, and may further include one or more input devices such as a keyboard, a mouse, a trackpad, a microphone, and/or the like.

Figure 3:
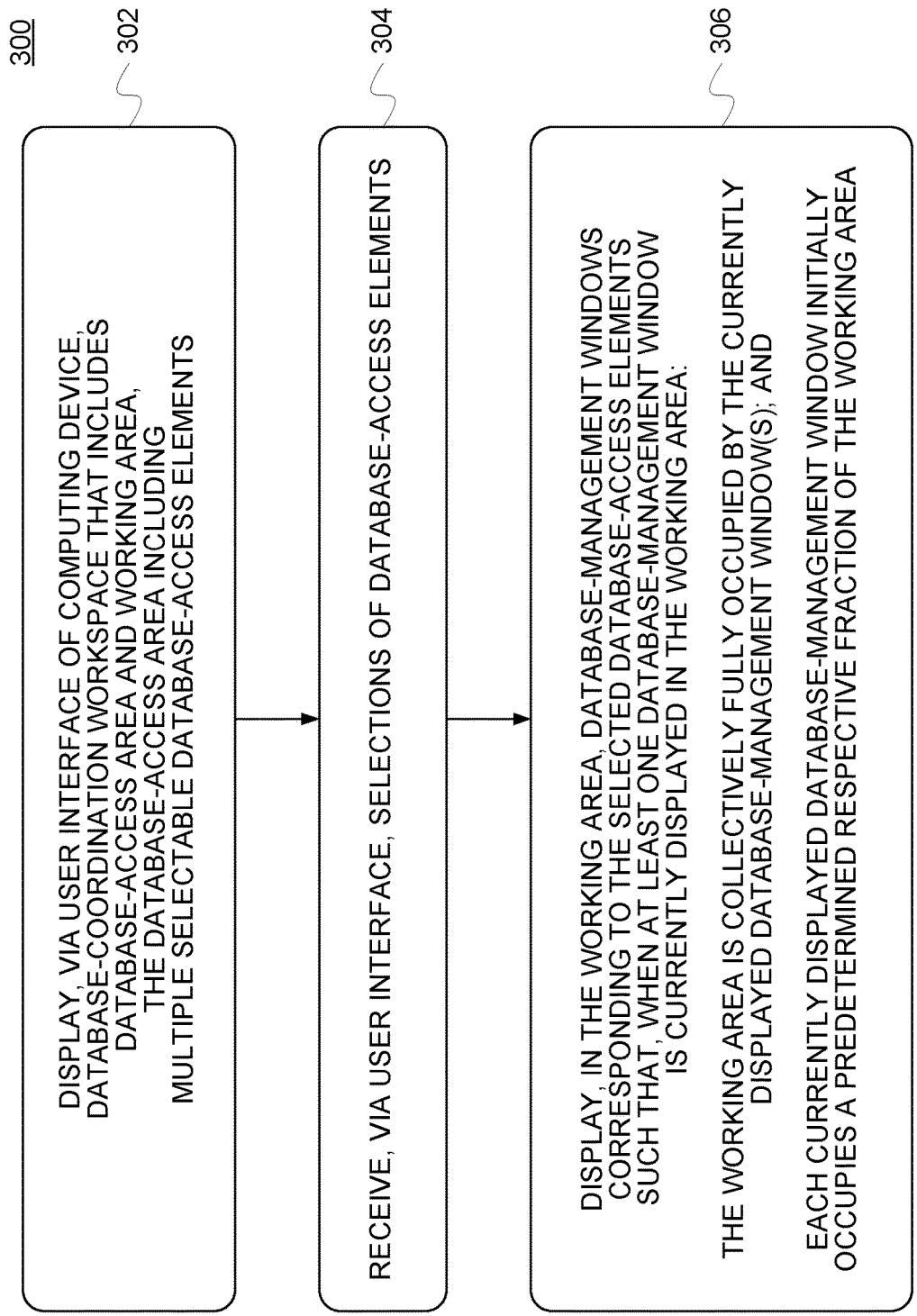
FIG. 3 depicts a flowchart of a method, in accordance with at least one embodiment.

FIG. 3 depicts a method 300 that is carried out by the workstation 130 in the below-described examples, though the method 300 could instead be carried out by one or more other suitable computing devices or combinations of such devices. The method 300 and various permutations thereof are described below in connection with FIG. 3, but also with reference to the screenshots that are depicted in FIG. 4 through FIG. 38.

Figure 4:
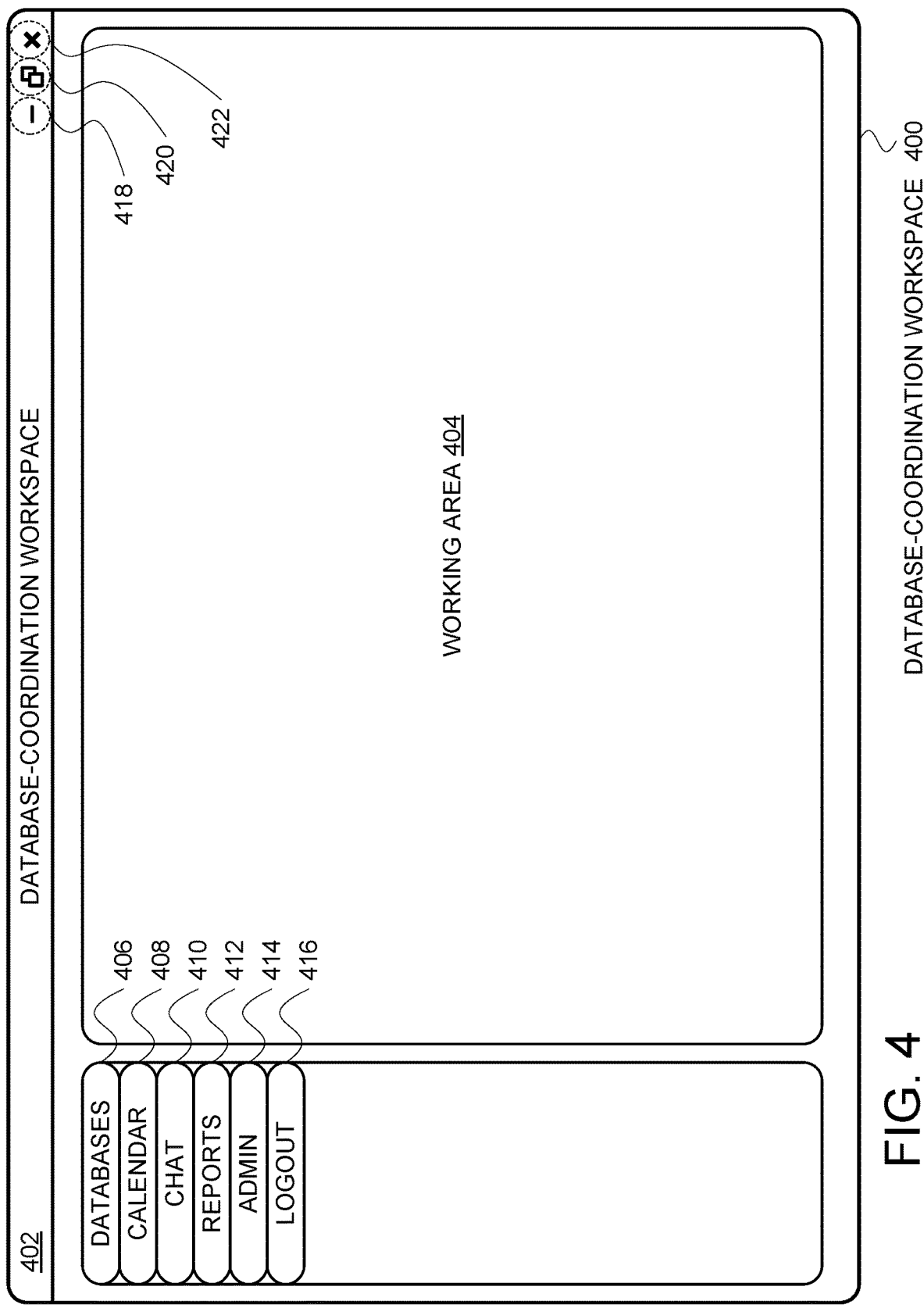
FIGS. 4-38 depict various different screenshots, in accordance with various different embodiments.

At step 302, the workstation 130 displays a database-coordination workspace via the display 210 of the user interface 208. An example initial screen of a database-coordination workspace 400 is depicted in FIG. 4, which shows the database-coordination workspace 400 as including a title bar 402, a working area 404, a databases UI element 406, a calendar UI element 408, a chat UI element 410, a reports UI element 412, and admin UI element 414, and a logout UI element 416. The function of the 406 is described below in connection with FIG. 5. The UI elements 408-410 are operable to launch and/or bring to the foreground associated modules related respectively to calendar functions, a chat interface, reporting capabilities, and administrative functions. The logout UI element 416 is operable to log a current user out of the database-coordination workspace 400. The title bar 402 includes a minimize element 418, a restore element 420, and a close element 422.

Figure 5:
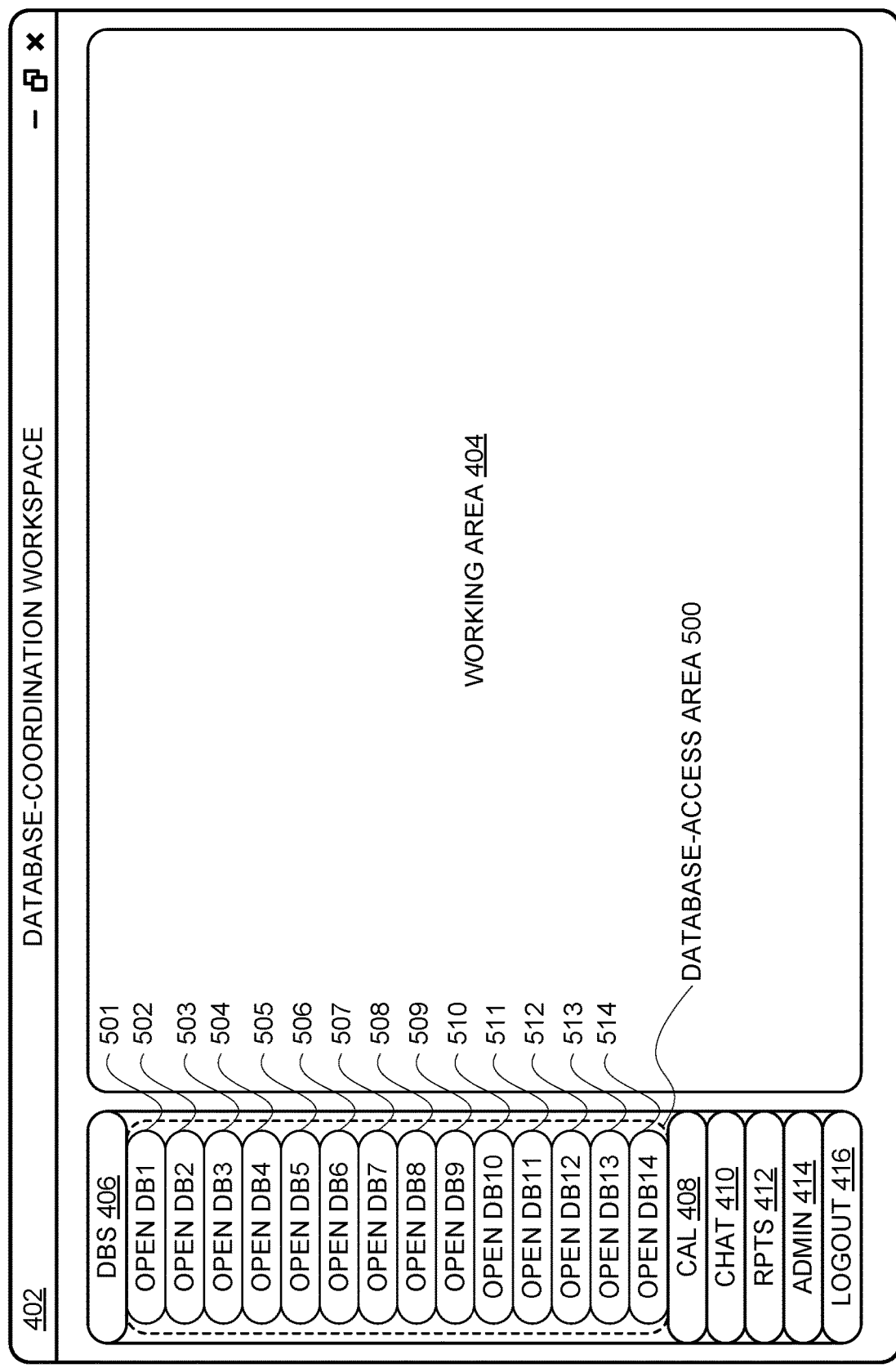

As part of step 302, the workstation 130 displays a DCW that includes a database-access area and a working area. FIG. 5 shows the DCW displaying those elements as a result of receiving a user selection (i.e., a UI input) of the databases UI element 406, which is operable to toggle between displaying and hiding a database-access area 500. Hereinafter, a click (and sometimes a double click) is used as an example user-selection input. This is by way of example and not limitation, and includes selection by tapping on a touchscreen as just one example.

As shown in FIG. 5, the database-coordination workspace 400 includes the database-access area 500 that includes selectable user-interface elements 501-514 that are respectively associated with opening databases numbered 1-14 in this example. Any number of databases could be used in any given implementation. By way of example and for ease of explanation, the selectable UI elements 501-514 are referred to hereinafter as buttons 501-514. Each of the buttons 501-514 is operable to display within the working area 404 a respective database-management window for the corresponding database. Examples are described below.

At step 304, the workstation 130 receives, via the user interface 208, selections of the buttons 501-514. At step 306, responsive to each such selection, the workstation 130 displays in the working area 404 a corresponding database-management window. As will be shown by way of example in connection with the numerous embodiments described herein, when at least one database-management window is currently displayed in the working area 404, the working area 404 is collectively fully occupied by the one or more currently displayed database-management windows, and furthermore, each currently displayed database-management window initially occupies a predetermined respective fraction of the working area 404.

In some cases, each currently displayed database-management window initially occupies an equal fraction of the working area. In such embodiments, when there is only one open DMW, that DMW occupies the entire working area 404, when there is exactly two open DMWs, they each occupy half of the working area 404, when there are exactly three open DMWs, they each occupy a respective third of the working area 404, and so forth.

In other instances, the predetermined respective fraction of the working area that is initially occupied by a given currently displayed database-management window is different than the predetermined respective fraction of the working area that is initially occupied by at least one other currently displayed database-management window. Thus, in one such example, a first-opened DMW occupies one third of the working area 404, and then a second-opened DMW occupies the remaining two thirds of the working area 404. And clearly numerous other examples could be listed here. In at least one such case, the amount of the working area 404 that is initially occupied by a given DMW is determined by one or more of what are referred to herein as working-area-occupancy requirements of that database-management window. For example, in an embodiment, if a given DMW only requires a certain amount of width of the working area 404 in a given configuration, that DMW is initially displayed in a manner that only occupies that required amount of width. In some cases, this width requirement is determined by a data field in the particular DMW.

As is the case between FIG. 4 and FIG. 5, for the most part, the screenshot figures that are described herein relate to one another sequentially—e.g., FIG. 5 depicts the result of a click on the 406 in FIG. 4. Such is the case with FIG. 4 through FIG. 16: starting with FIG. 5 in that group, each figure in that group depicts the result of a particular UI input (e.g., click) on the previous figure. Those UI inputs are specified in the below descriptions of those figures.

Figure 16:
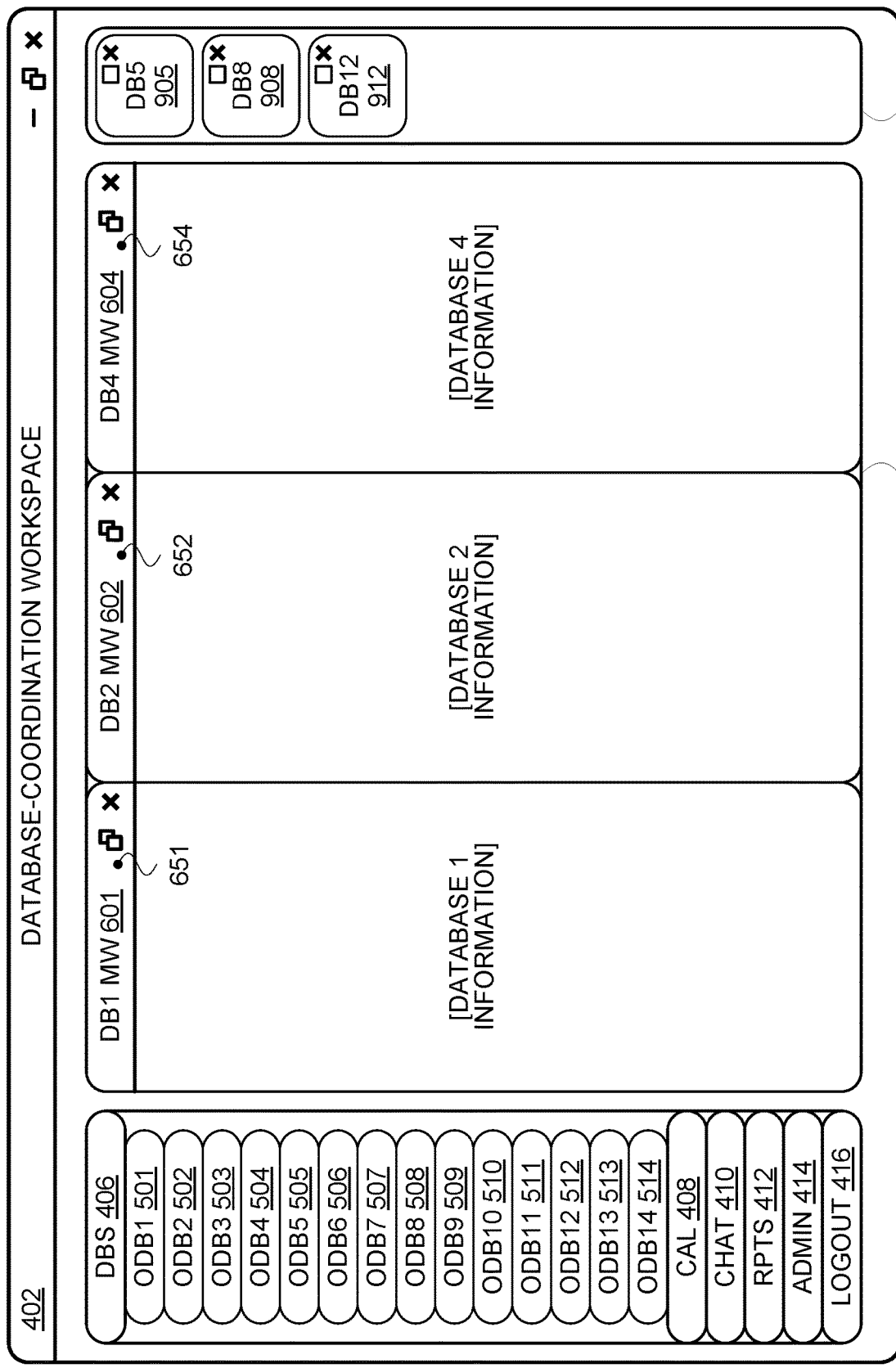
Figure 20:
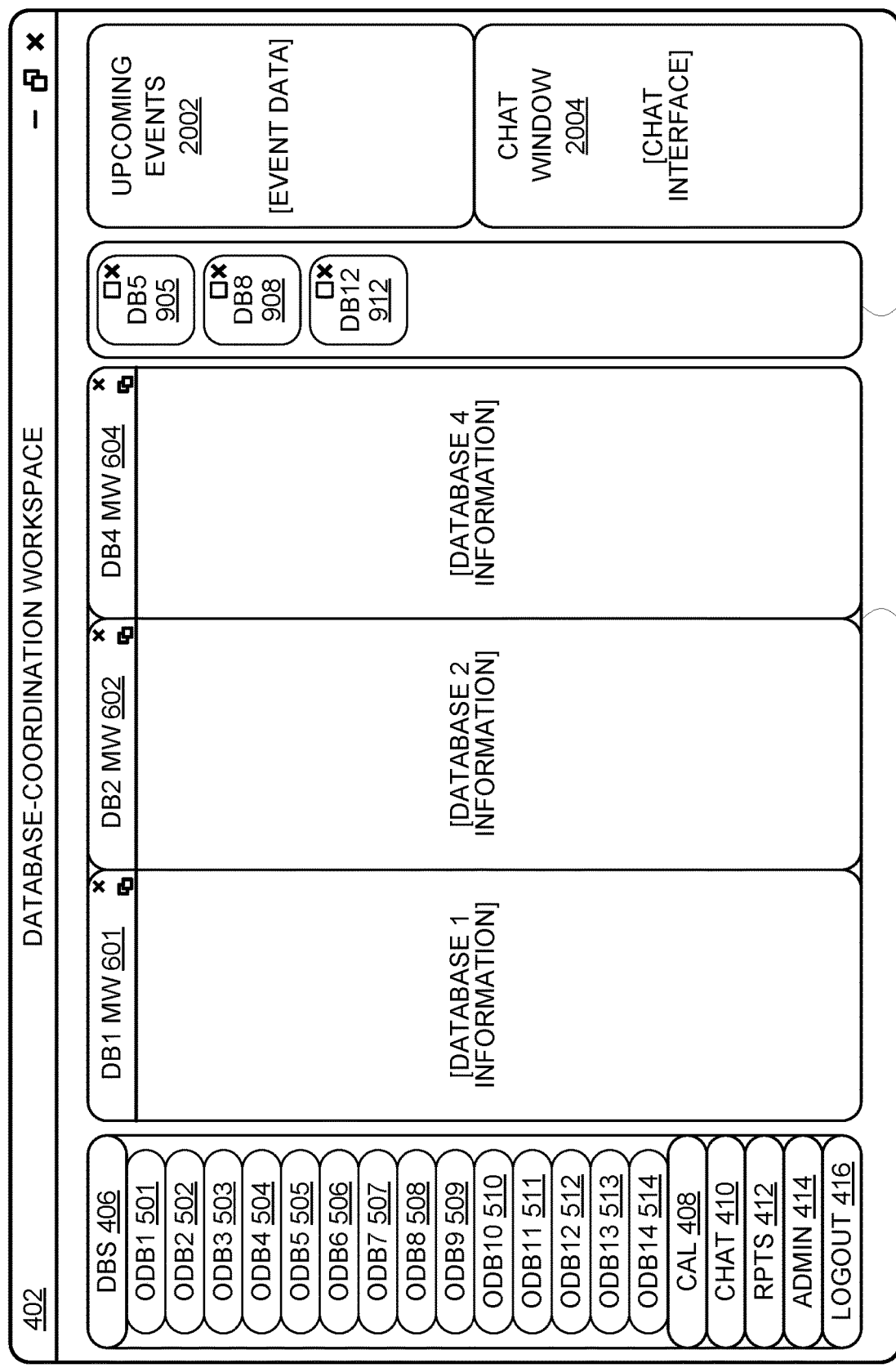
Figure 21:
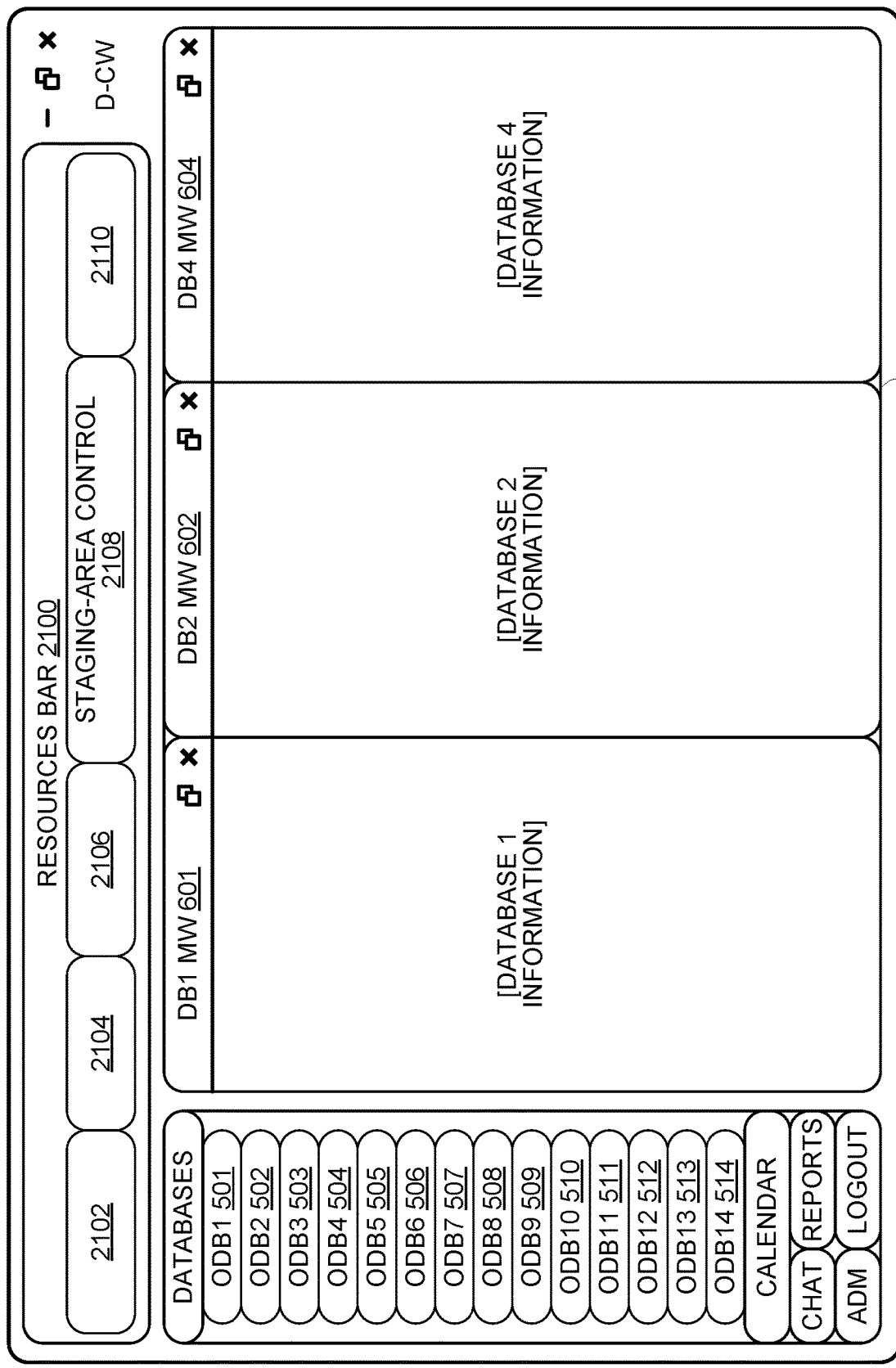
Figure 22:
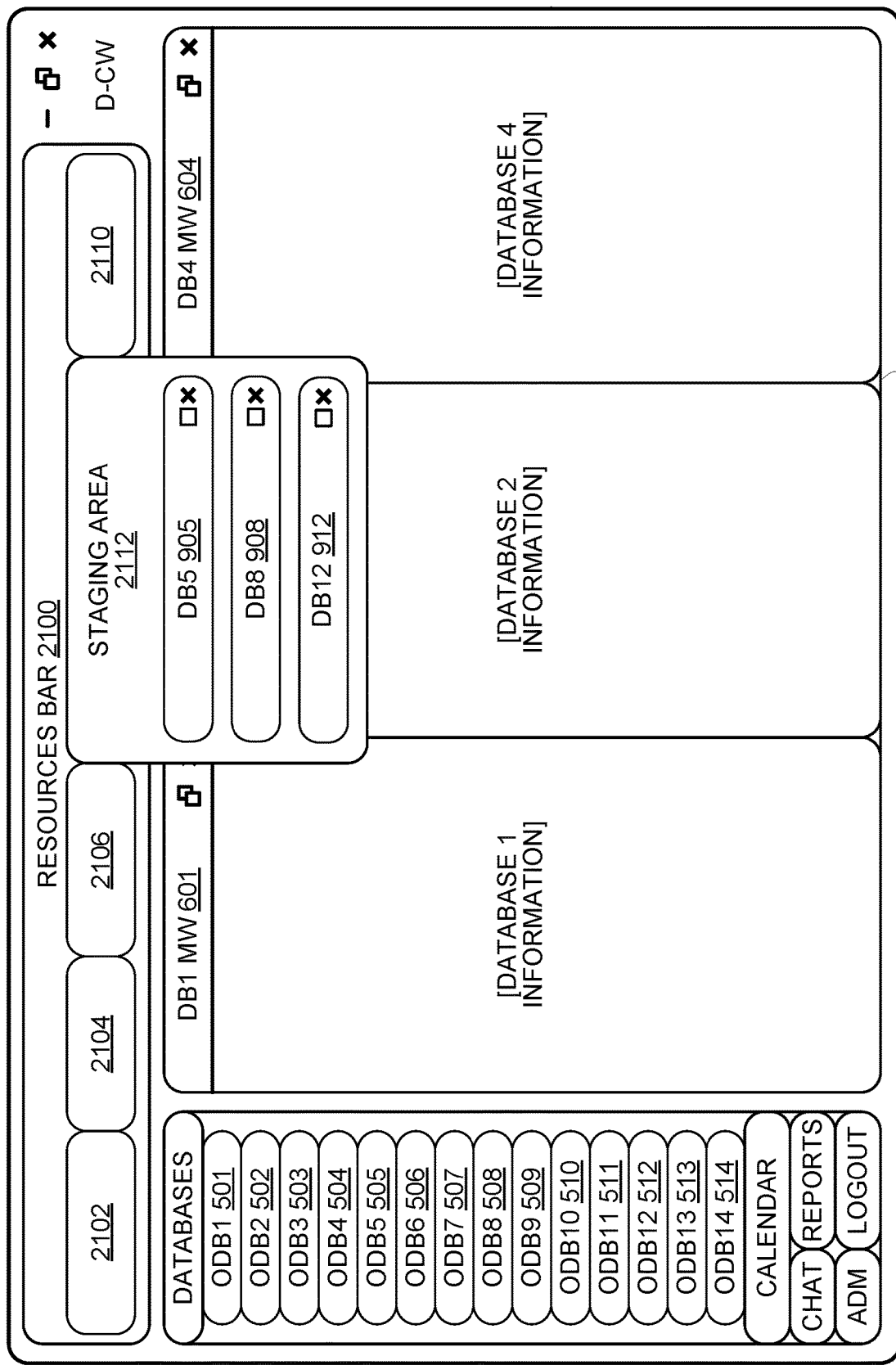

FIG. 17 through FIG. 24 are not sequentially related in that manner; rather each of those figures shows a particular one or more features that are present in at least one embodiment. In other words, the state of the database-coordination workspace 400 is substantially the same in each of FIG. 16 through FIG. 24 inclusive. The sequential nature of the figures then picks up again, as FIG. 25 depicts a result of a particular click being received in the state of the database-coordination workspace 400 that is depicted in FIG. 16. This continues through FIG. 32. Thereafter, a new sequence begins and extends through the remaining figures, numbered FIG. 33 through FIG. 38. This sequence begins with FIG. 33 showing the same state of the database-coordination workspace 400 that is depicted in FIG. 22.

Returning now to FIG. 6, there is shown the result of a click in FIG. 5 on the open-database-1 (DB1) button 501 (the "ODB1 501"). This results in the display in the entirety of the working area 404 of a DB1 DMW 601, which includes a title bar 651 that itself includes a minimize element 620 and a close element 622. With respect to DMWs in this disclosure, it can be seen in the figures that each one includes a respective minimize element and a respective close element in their respective title bars. These are not explicitly numbered in the ensuing figures. Moreover, it should be understood that the use of language regarding such DMWs being closed or minimized is a reference to these respective UI elements of those respective DMWs being clicked on. Moreover, as is the case in a number of the ensuing figures, the contents of DB1 that are shown in the DB1 DMW 601 are referred to only generally in FIG. 6 as "DATABASE 1 INFORMATION." In at least one embodiment, one or more of the database-management windows includes one or more database-management elements for one or both of viewing and editing information in the corresponding database.

Figure 6:
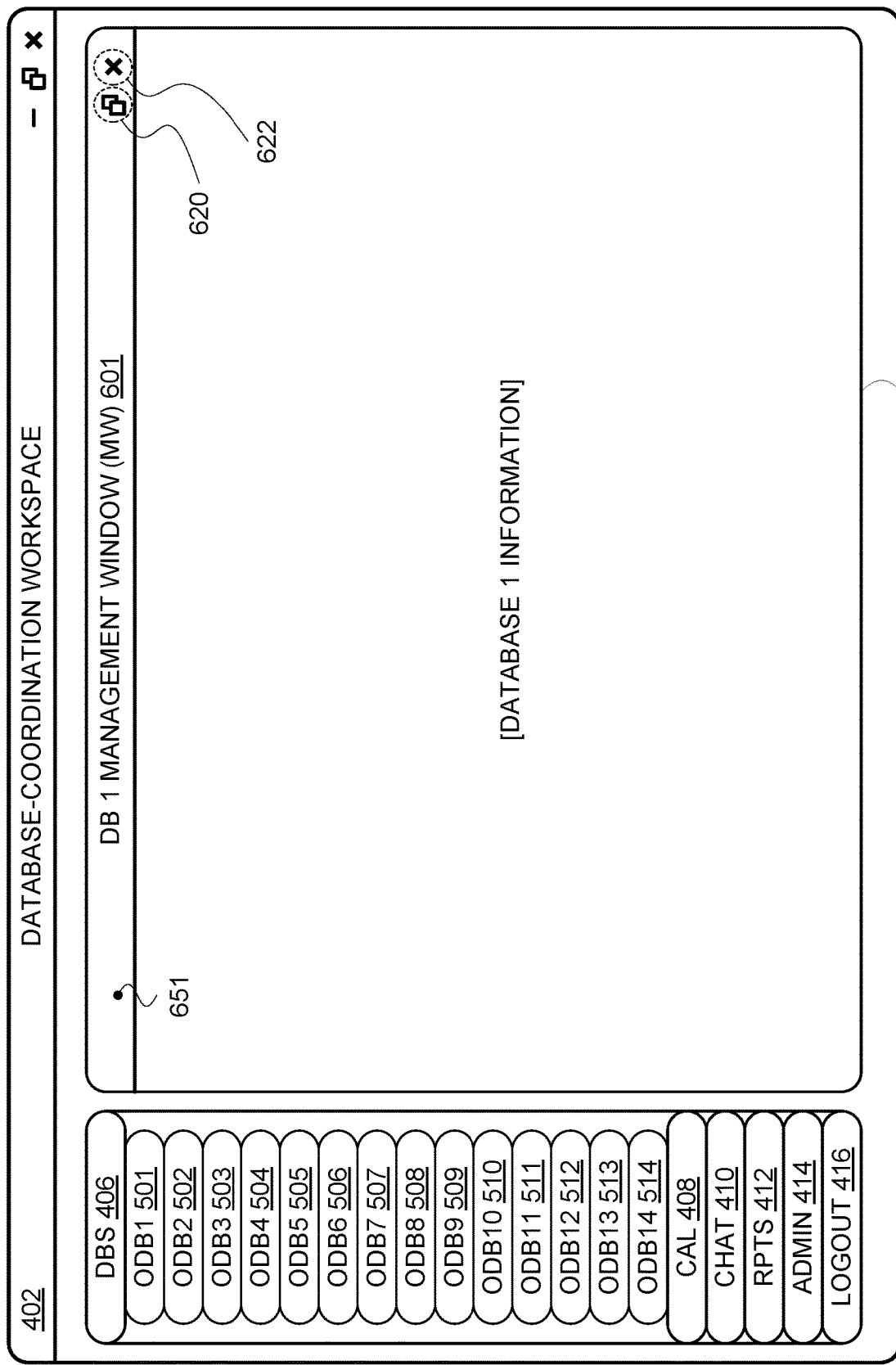
Figure 7:
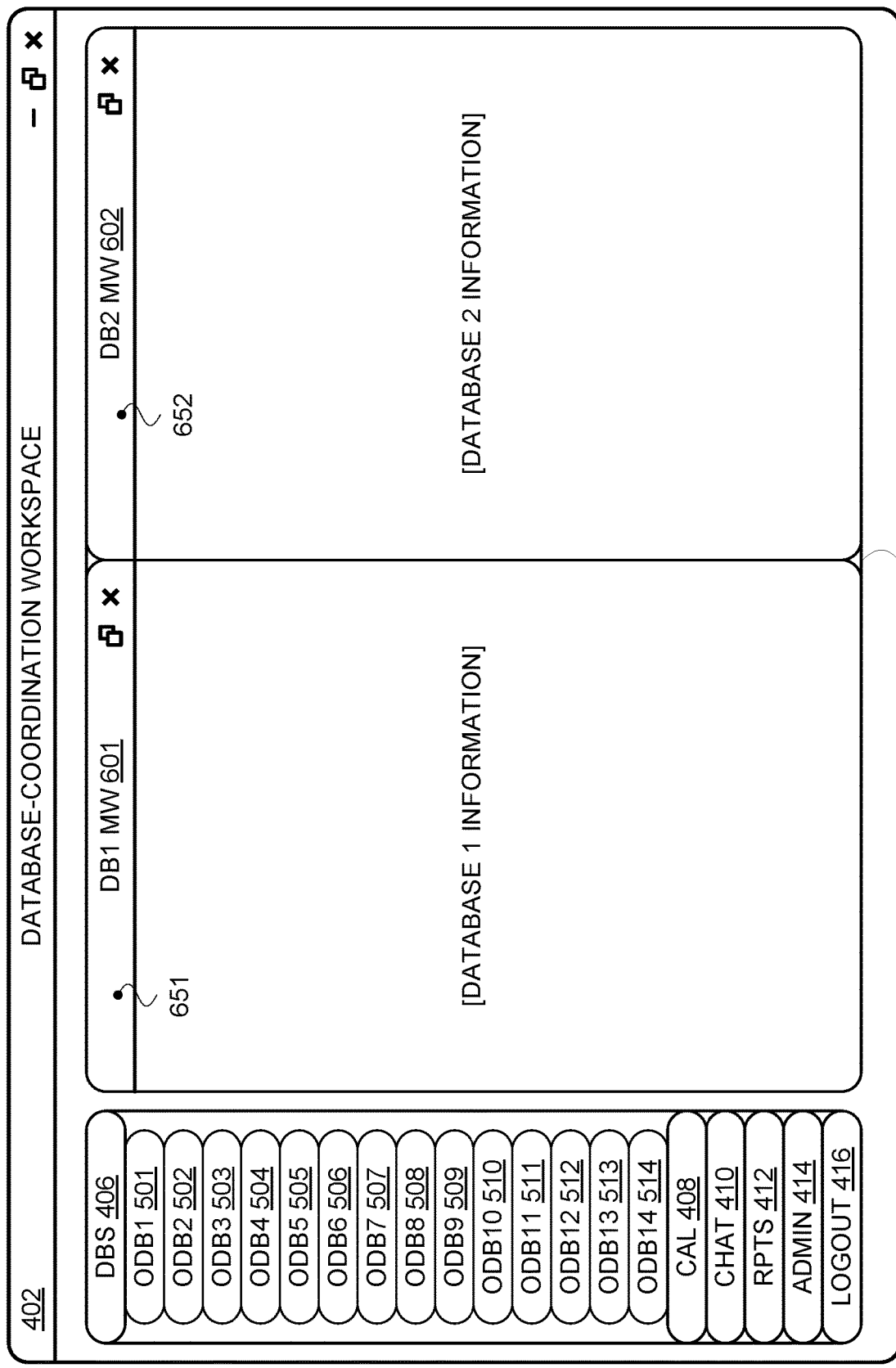

FIG. 7 shows the database-coordination workspace 400 after having received a click in FIG. 6 on the ODB2 502. The working area 404 is occupied in respective halves by the DB1 DMW 601 and the DB2 DMW 602, the latter of which corresponds to DB2. The DB2 DMW 602 has a title bar 652. As can be seen, in the embodiment described here, the newly opened DB2 DMW 602 opened to the right of the DB1 DMW 601 that was already open. This is by way of example only, as certainly other approaches such as to the left, above, or under the already open DMW could instead be used.

Figure 8:
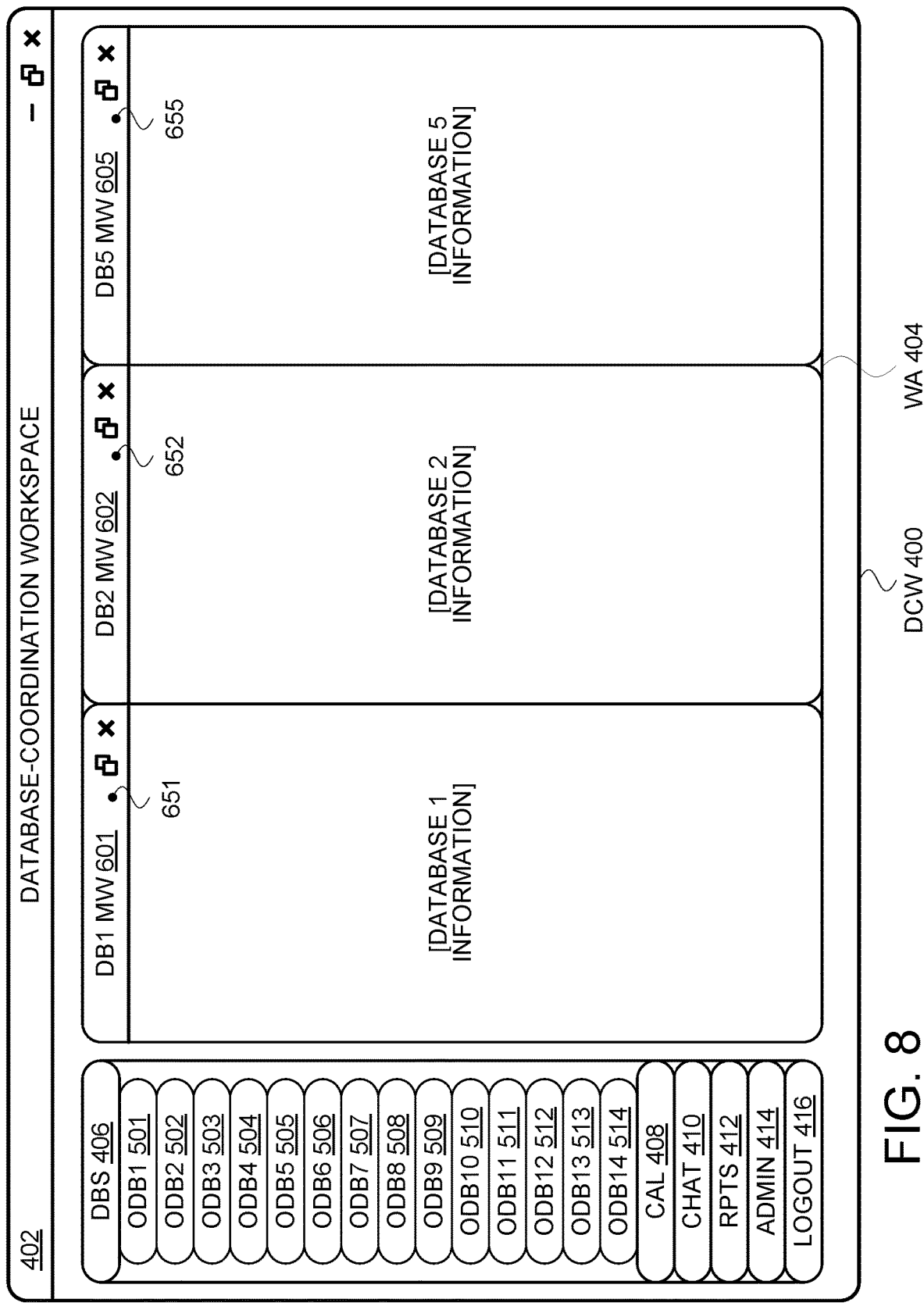

FIG. 8 shows the database-coordination workspace 400 after having received a click in FIG. 7 on the ODB5 505. The newly opened DB5 DMW 605 has a title bar 655, and opened to the right of the already open DB1 DMW 601 and DB2 DMW 602. The working area 404 is occupied in respective thirds by the DB1 DMW 601, DB2 DMW 602, and the DB5 DMW 605. In some embodiments, the lefthand column that contains the UI elements 406-416 and the database-access elements 501-514 can be minimized, causing the size of the working area 404 on the database-coordination workspace 400 to commensurately increase. It is further noted that the respective display sizes of the various DMWs and other elements that are described herein are computed in at least one embodiment using available pixel dimensions and accordingly dividing those available pixel dimensions by the number of, e.g., DMWs, to obtain a display size in pixels for each given UI element. Those of skill in the art are familiar with such arithmetic.

Figure 9:
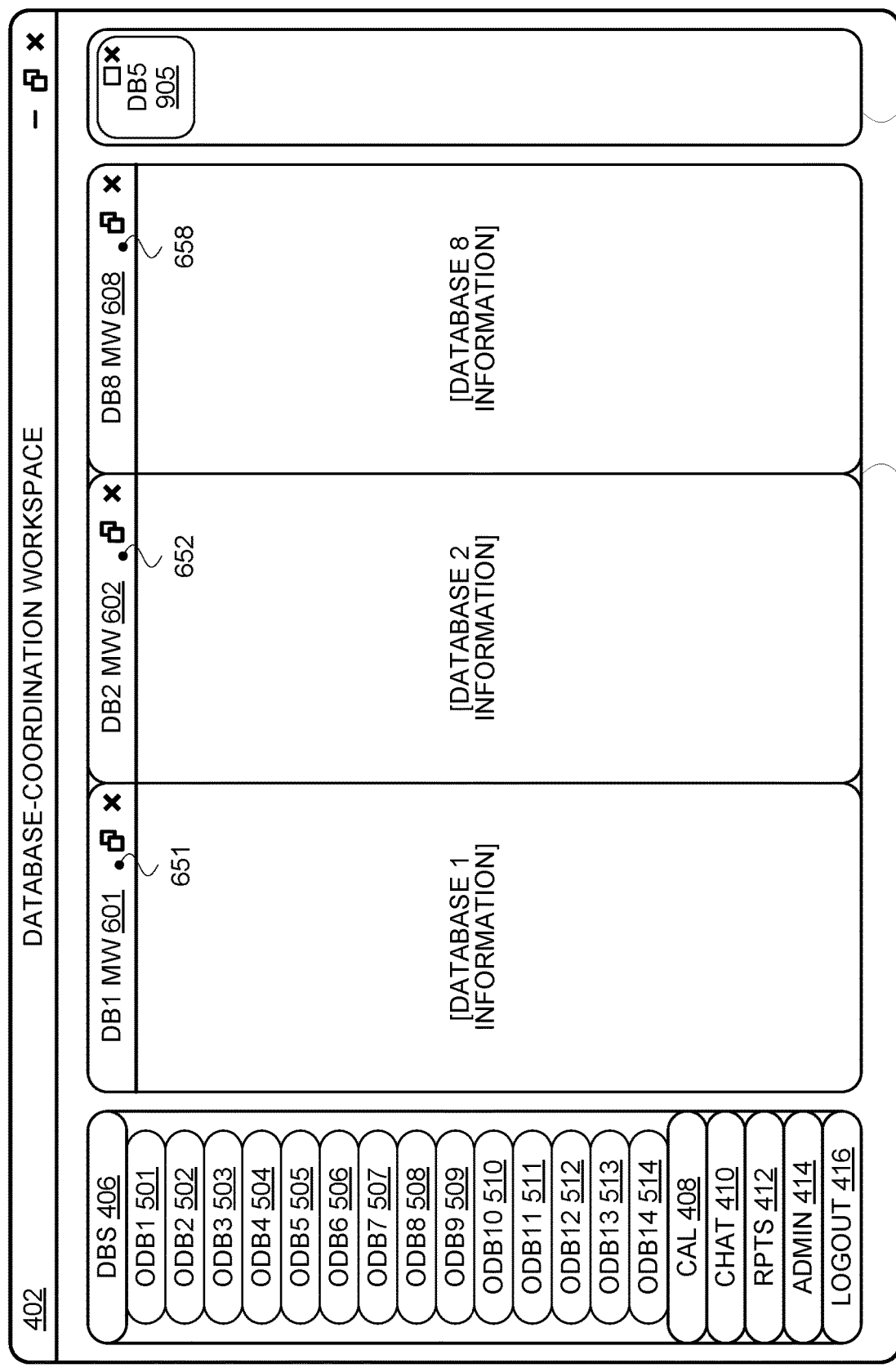

FIG. 9 shows the database-coordination workspace 400 after having received a click in FIG. 8 on the ODB8 508, which corresponds to DB8. In some embodiments, the working area is configured to concurrently display at most a working-area limit of database-management windows. In this embodiment being described in this sequence of figures, that limit is three. As such, when the three DMWs described in connection with FIG. 8 were already displayed in the working area 404 and a click on the ODB8 508 was received, the system responsively adds a staging area 900 to the database-coordination workspace 400. Moreover, the previously displayed DB5 DMW 605 is minimized into a DMW shortcut DB5 905 in the staging area 900, which in FIG. 9 is displayed next to and to the right of the working area 404 on the database-coordination workspace 400. In at least one embodiment, DMW shortcuts have the appearance of being title bars without corresponding windows. Other options could be implemented as well, such as thumbnails and others. Moreover, in addition to minimizing the DB5 DMW 605 into the DMW shortcut DB5 905 in the staging area 900, the system displays the newly selected DB8 DMW 608 in the righthand third of the working area 404. The DB5 DMW 605 has a title bar 658.

The transition between FIG. 8 and FIG. 9 illustrates an embodiment in which the staging area 900 is not displayed on the database-coordination workspace 400 until it is needed—i.e., until one of the two events happens: either a DMW that is currently displayed in the working area 404 gets manually minimized by a user input, or the working area 404 is already at capacity and a user input is received that requests opening of a DMW associated with another database. In such embodiments, the working area 404 is dynamically shrunk whenever the staging area 900 is displayed and is dynamically re-expanded whenever the staging area is empty and therefore removed from the database-coordination workspace 400.

In other embodiments, however, the staging area is always displayed on the database-coordination workspace regardless 400 of whether one or more database-management windows are currently minimized as DMW shortcuts. In still other embodiments that are described below, the staging area is never permanently displayed even when it contains one or more DMW shortcuts; rather it is hidden using a toggleable button or other UI control.

Figure 10:
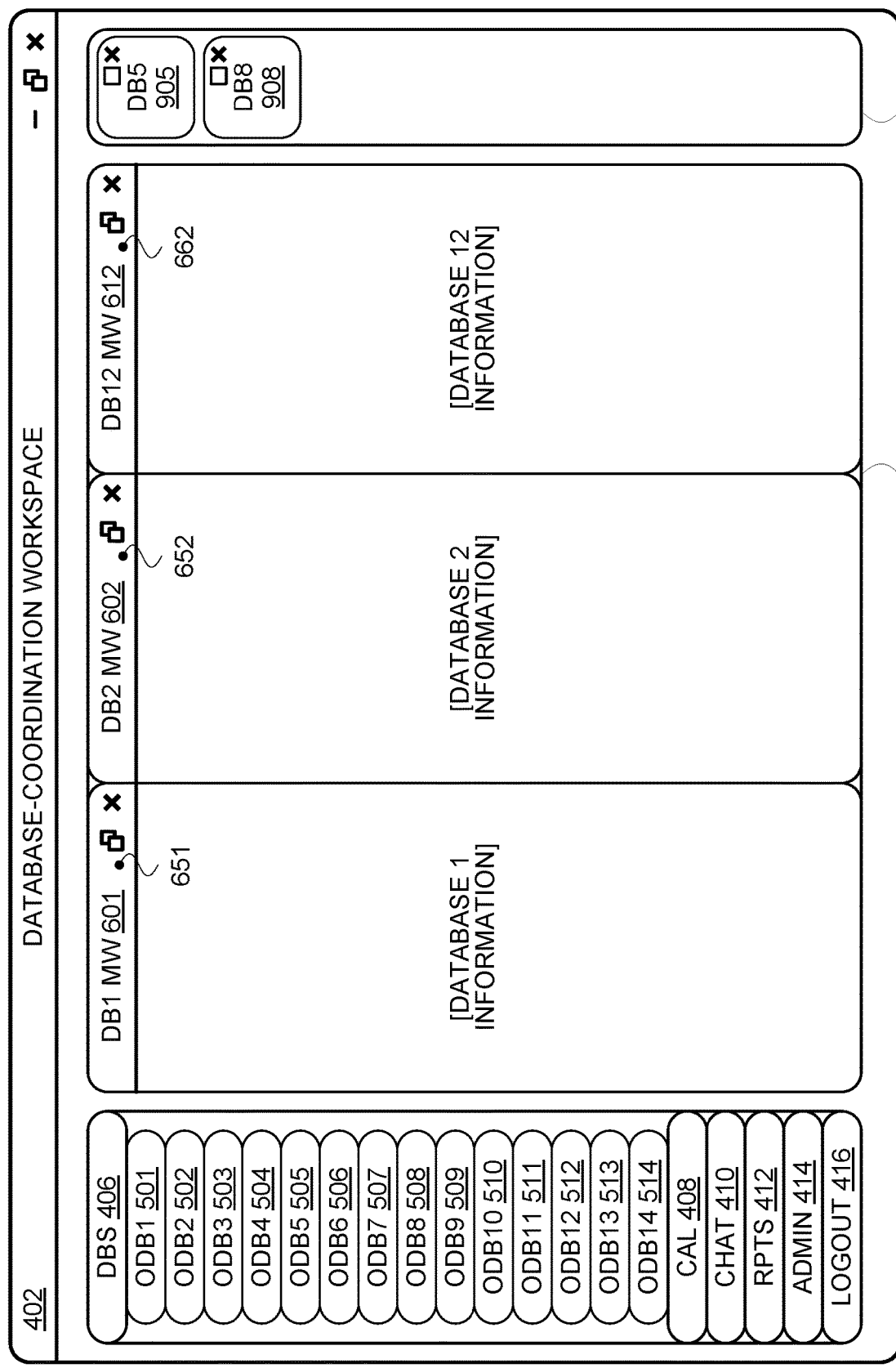

FIG. 10 shows the database-coordination workspace 400 after having received a click in FIG. 9 on the DOB12 512. This causes the DB12 DMW 612 (having a title bar 662) to take over the righthand third of the working area 404, and also causes the DB8 DMW 608 to be minimized into a DMW shortcut DB8 908 in the staging area 900 along with the DMW shortcut DB5 905 that was already there. It is noted that, in the depicted embodiment, DMW shortcuts in the staging area 900 remain sorted in the same order in which the corresponding buttons appear in the database-access area 500. In this example, that order is alphabetical, though it could be according so some priority ranking, most recently used (MRU), or some other approach deemed suitable for a given implementation. Moreover, although this is not the case in the embodiments depicted in the figures, in some embodiments the DMWs that are displayed at any given time in the working area 404 are displayed according to that common order as well.

Figure 11:
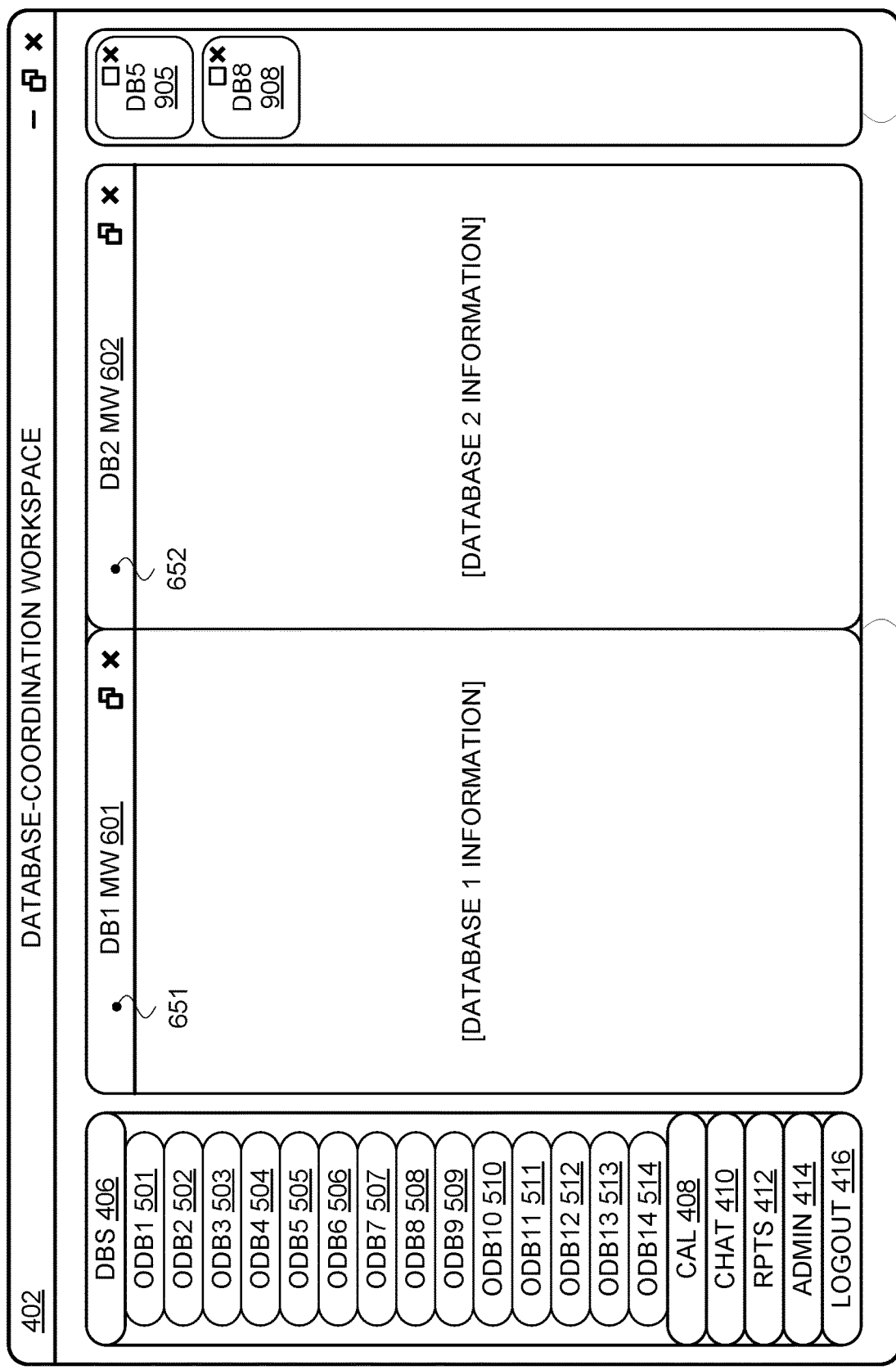

FIG. 11 shows the database-coordination workspace 400 after having received a click in FIG. 10 to close the DB12 DMW 612. This results in a split between the DB1 DMW 601 and the DB2 DMW 602 in the working area 404, with the DMW shortcuts DB5 905 and DB8 908 still staged in the staging area 900.

Figure 12:
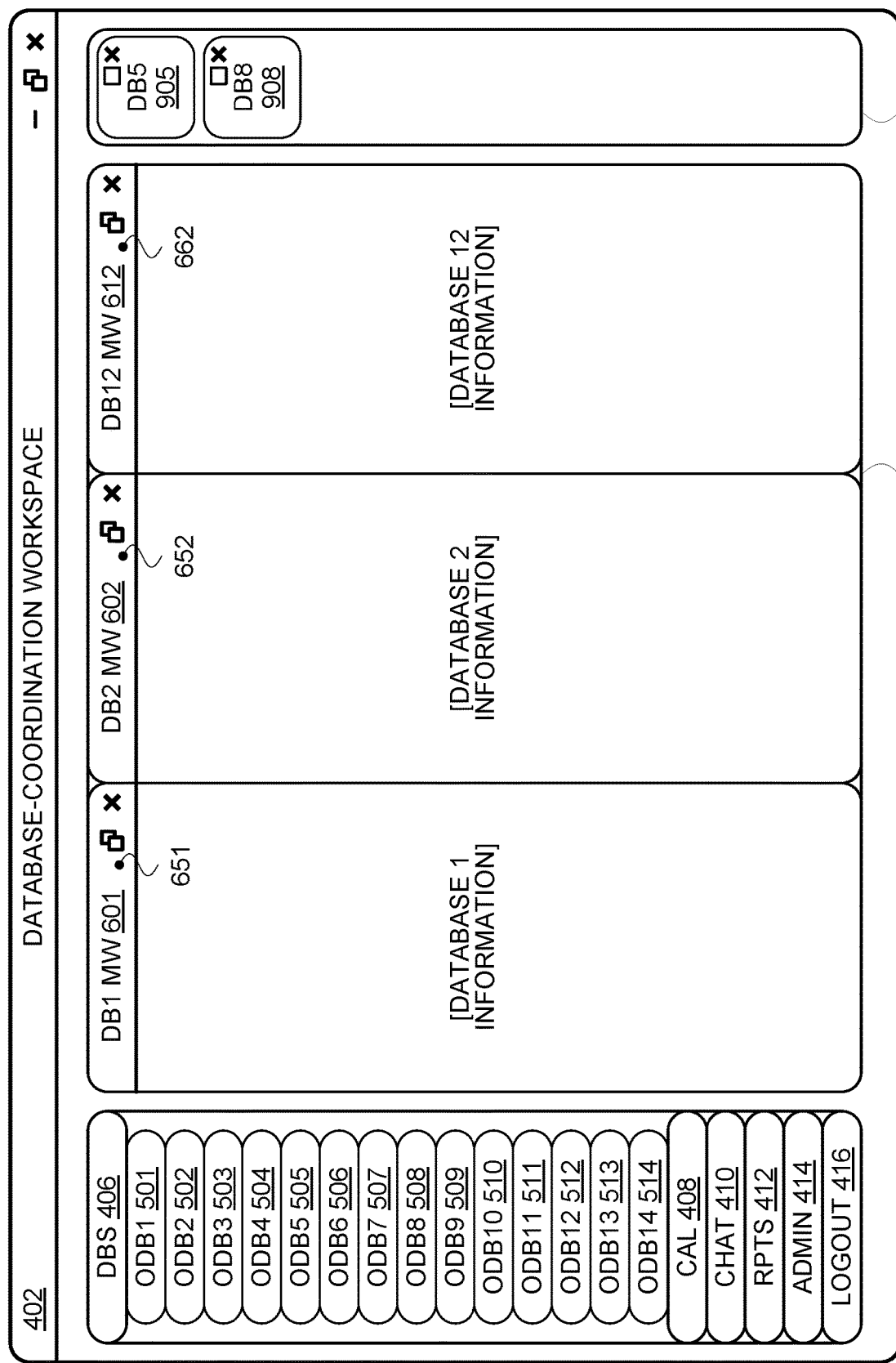

FIG. 12 matches FIG. 10, showing the database-coordination workspace 400 after having received a click in FIG. 11 on the ODB12 512 to reopen the DB12 DMW 12.

Figure 13:
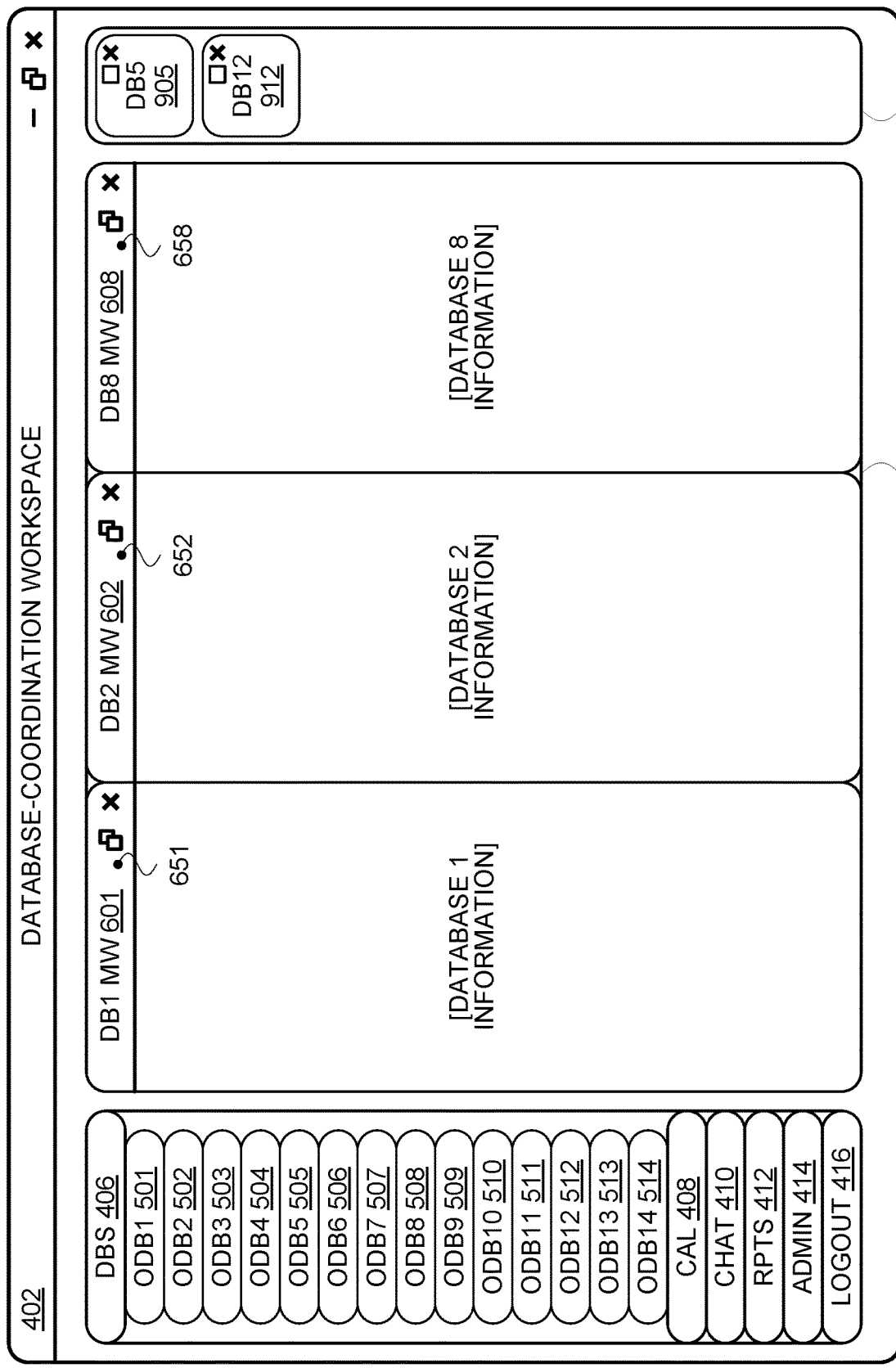

FIG. 13 shows the database-coordination workspace 400 after having received a click in FIG. 12 on the DMW shortcut DB8 908. This results in a swap between DB8 and DB12, where the DB8 DMW 608 takes over the righthand third of the working area 404, and the DB12 DMW 612 gets minimized to a DMW shortcut DB12 912 in the staging area 900.

Figure 14:
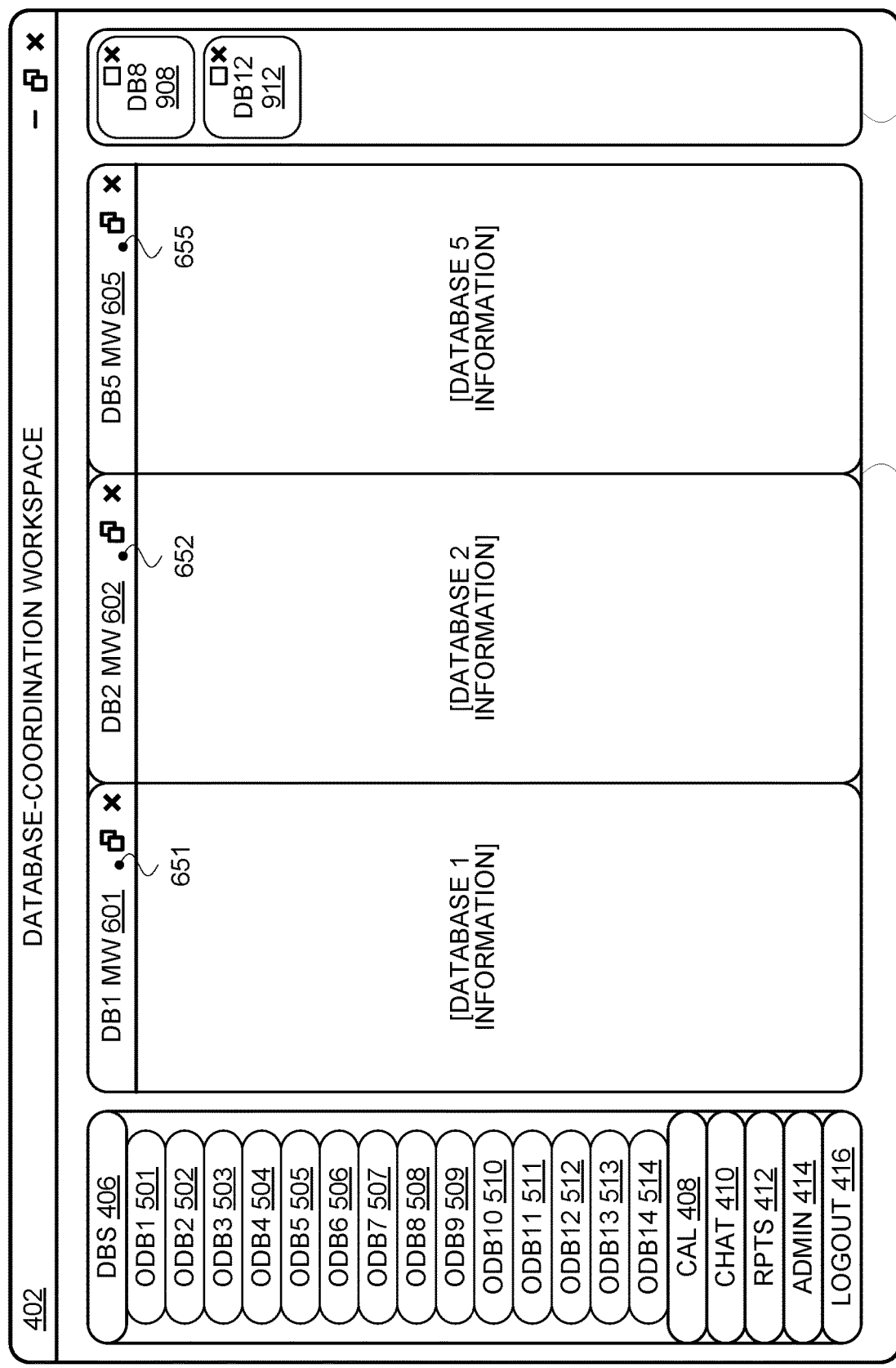

FIG. 14 shows a further swap between DB5 and DB8, resulting from the database-coordination workspace 400 having received a click in FIG. 13 on the DMW shortcut DB5 905. The result of this is that the DB5 DMW 605 takes over the righthand third of the working area 404, while the DB8 DMW 608 gets minimized into the DMW shortcut DB8 908.

Figure 15:
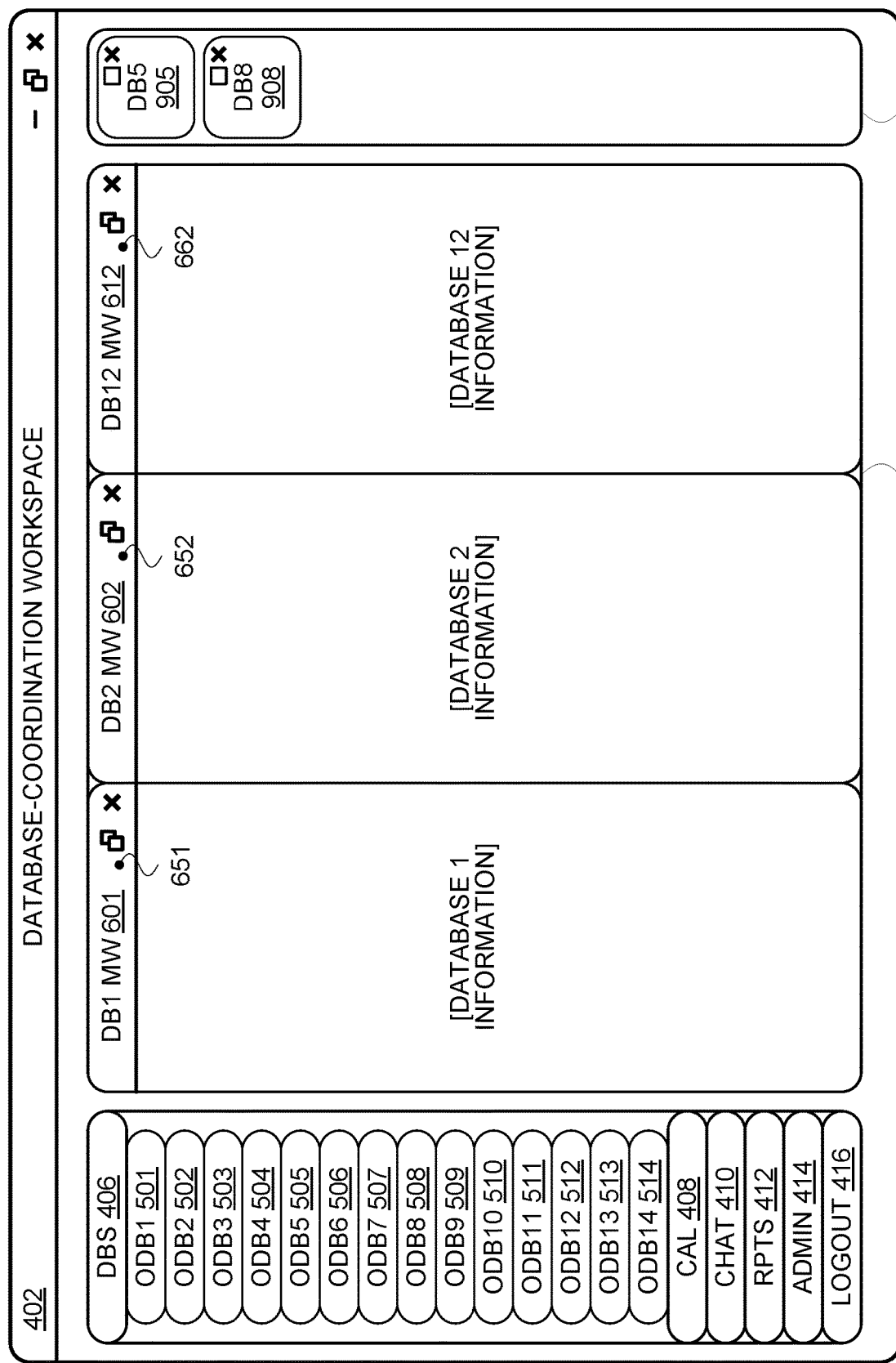

FIG. 15 shows the cycle come all the way around again via a swap between DB5 and DB12, resulting from database-coordination workspace 400 having received a click in FIG. 14 on the DMW shortcut DB12 912. The result of this is that the 612 takes over the righthand third of the working area 404, while the 608 gets minimized into the 908.

FIG. 16 shows the database-coordination workspace 400 after having received a click in FIG. 15 on the ODB4 504, resulting in the DB4 DMW 604 (having a title bar 654) taking over the righthand third of the working area 404, and resulting in the minimization of the DB12 DMW 612 into the DMW shortcut DB12 912 in the staging area 900. This substantive state of the database-coordination workspace 400—i.e., with the working area 404 split three ways between the DB1 DMW 601, the DB2, DMW 602, and the DB4 DMW 604, and further with the staging area containing the three DMW shortcuts DB5 905, DB8 908, and DB12 912, is maintained throughout FIG. 17 through FIG. 24 for illustration of various other features in various embodiments.

In some embodiments, the database-coordination workspace 400 visually indicates in the database-access area 200 which (if any) one or more of the corresponding databases are currently displayed in the working area 404, which (if any) one or more of the corresponding databases are currently minimized to DMW shortcuts in the staging area 900, and which (if any) of the corresponding databases are neither.

Figure 17:
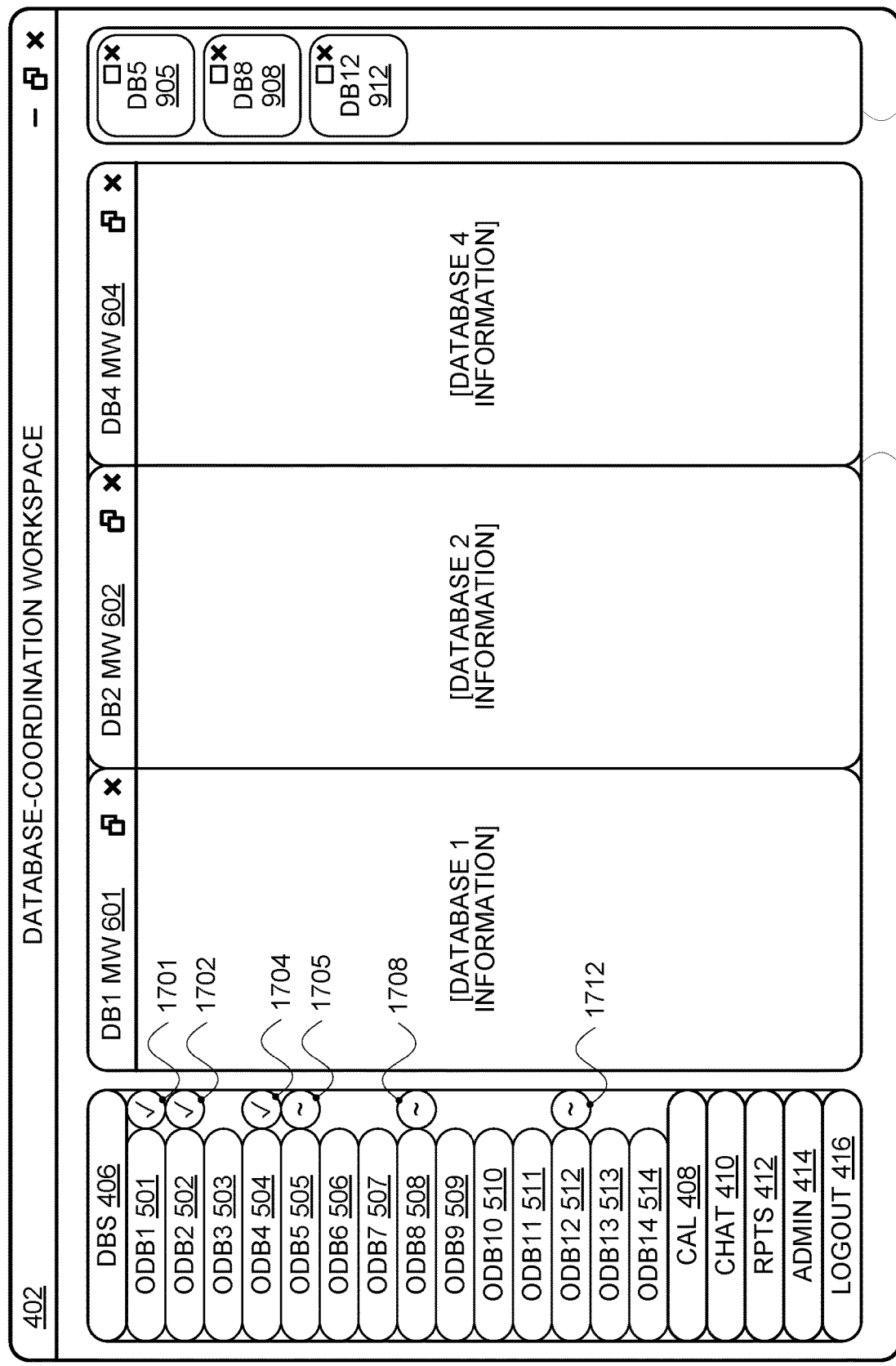

FIG. 17 depicts an embodiment in which these statuses are represented with different types of icons. Checkmark icons 1701, 1702, and 1704 respectively indicate that the databases DB1, DB2, and DB4 are currently displayed as DMWs in the working area 404. Tilde icons 1705, 1708, and 1712 respectively indicate that the databases DB5, DB8, and DB 12 are currently minimized to respective DMW shortcuts in the staging area 900. A lack of icon next to every other button indicates that those respective databases are neither.

Figure 18:
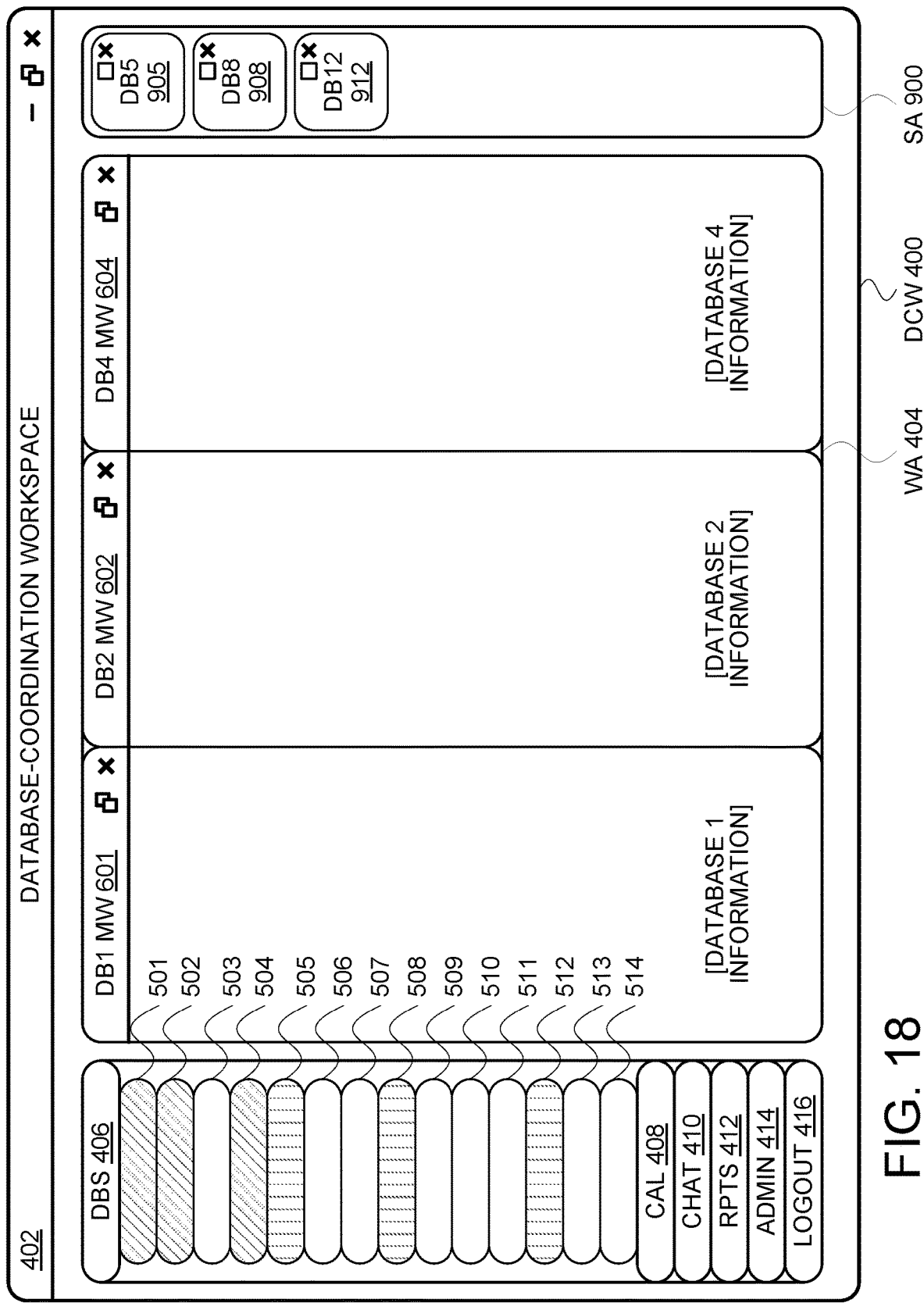

FIG. 18 depicts an embodiment in which these statuses are represented with different colors highlighting the corresponding buttons. A first color highlights the buttons 501, 502, and 504, while a second color highlights the buttons 505, 508, and 512, and no color is used to highlight the remaining buttons. In other embodiments, colored fonts are used instead of or in addition to colored highlight fills of the buttons.

Figure 19:
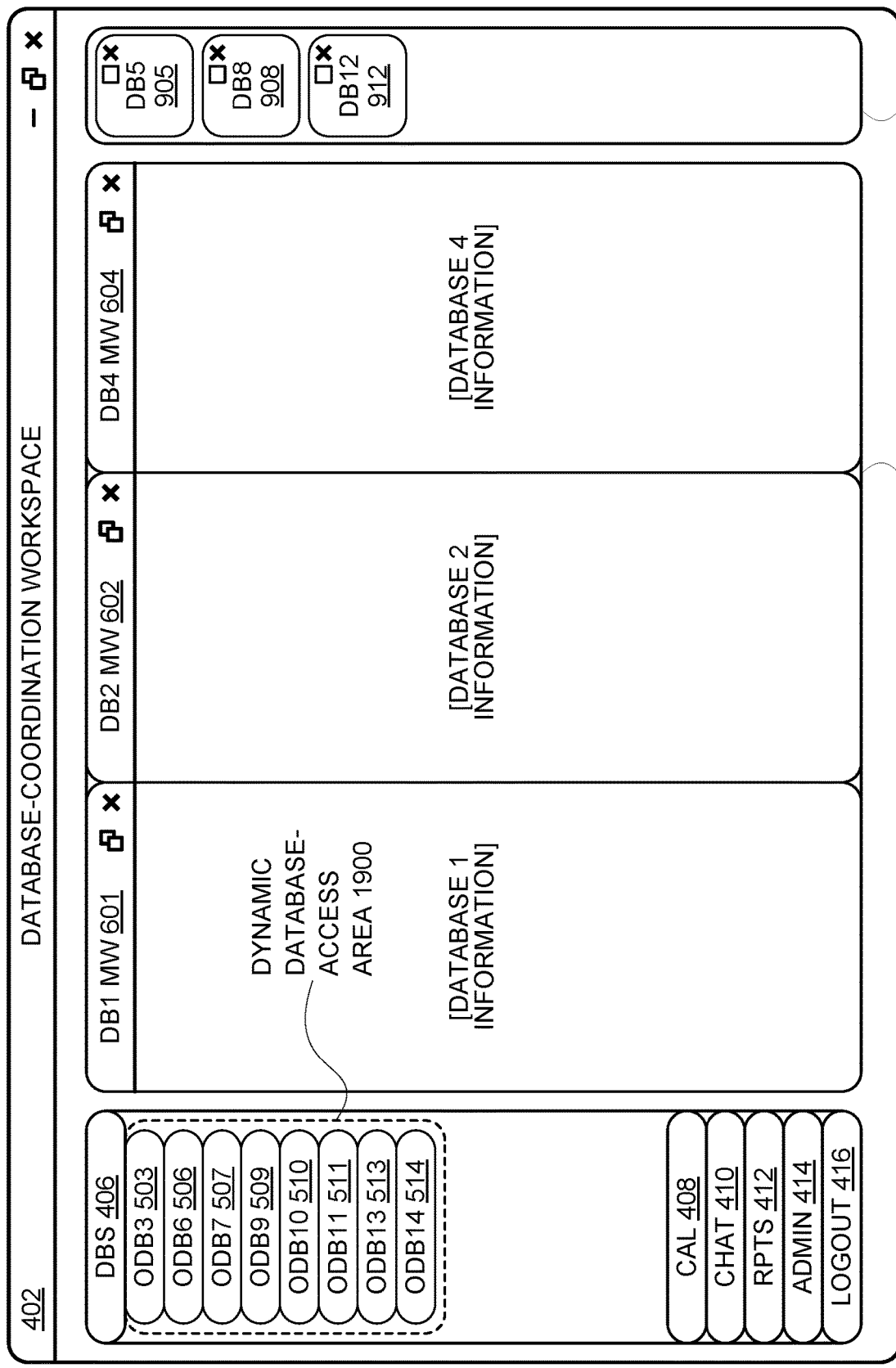

FIG. 19 depicts an embodiment in which these statuses are represented less granularly, in that all of the buttons corresponding to the active and minimized databases have simply been removed from what is labeled in FIG. 19 as the dynamic database-access area 1900. Such an embodiment may make it easier for a user to quickly ascertain which databases are currently closed, as opposed to having the entire list on the lefthand side of the screen the entire time, though there are certainly benefits to that as well.

FIG. 20 shows an embodiment in which two additional functional modules are displayed on the database-coordination workspace 400. The first of those two is an upcoming-events module 2002 that displays event data, perhaps in integration with the calendar UI element 408 and with one or more databases that relate to time-and-date-type events. The second is a chat window 2004 that displays a chat interface, which users of the system at different workstations and in various different locations could use to communicate with one another securely through the system. In some embodiments, one or both of the upcoming-events module 2002 and the chat-window module 2004 are displayed on the database-coordination workspace 400 at all times.

Most of the embodiments described above include the staging area, when displayed, shown as a right-side column next to the working area 404 on the database-coordination workspace 400. In some embodiments, however, as mentioned above, the staging area is toggleable with respect to being displayed or not using a staging-area-toggling user-interface element.

FIG. 21 shows one such embodiment. It is noted in the database-coordination workspace 400 of FIG. 21 that the working area 404 is able to take up significantly more area of the database-coordination workspace 400 than in embodiments in which the staging area 900 is displayed. Moreover, the database-coordination workspace 400 of FIG. 21 also includes a resources bar 2100 across the top of the database-coordination workspace 400, positioned where the ribbon feature of many Microsoft Office products and the favorites bar of many web browsers, as well as the toolbars of numerous native and web-based applications are commonly positioned. As depicted in FIG. 21, the resources bar 2100 includes a number of resource-bar buttons 2102, though 2210, including a staging-area-control button 2108. In FIG. 21, the depiction is of the database-coordination workspace 400 with the display of any staging area currently toggled off.

FIG. 22 shows the database-coordination workspace 400 after having received a click in FIG. 21 on the staging-area-control button 2108, resulting in display of a staging area 2112 that includes the aforementioned DMW shortcuts DB5 905, DB8 908, and DB12 912. In the depiction of FIG. 22, the staging area 2112 overlays a portion of the working area 404. Moreover, the staging area 2210 is attached to (though obscuring) the 2108 in the fashion of a dropdown menu.

Figure 23:
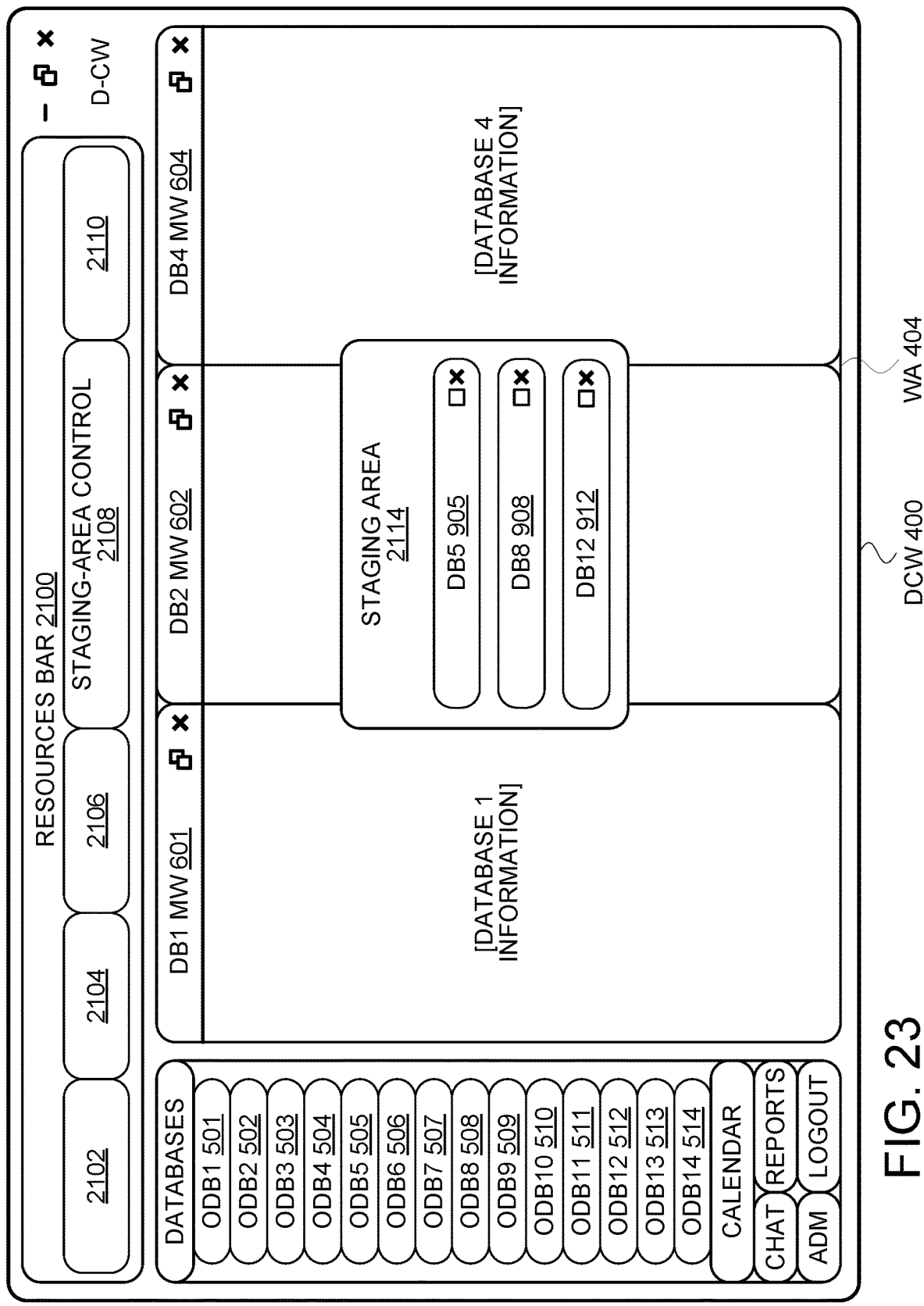

FIG. 23 is quite similar to FIG. 22, other than that a staging area 2114 is shown as being detached from the 2108, though having the same content as the 2112 of FIG. 21. In some detached-staging-area embodiments, the 2114 is movable by the user; in others it is not. Either way, some users may prefer a more central display of the staging area as compared with FIG. 21, while certainly others will prefer the embodiment depicted in FIG. 21.

This description now returns to the sequence of screenshots that is discussed above prior to the description of FIG. 17 through FIG. 23.

Figure 24:
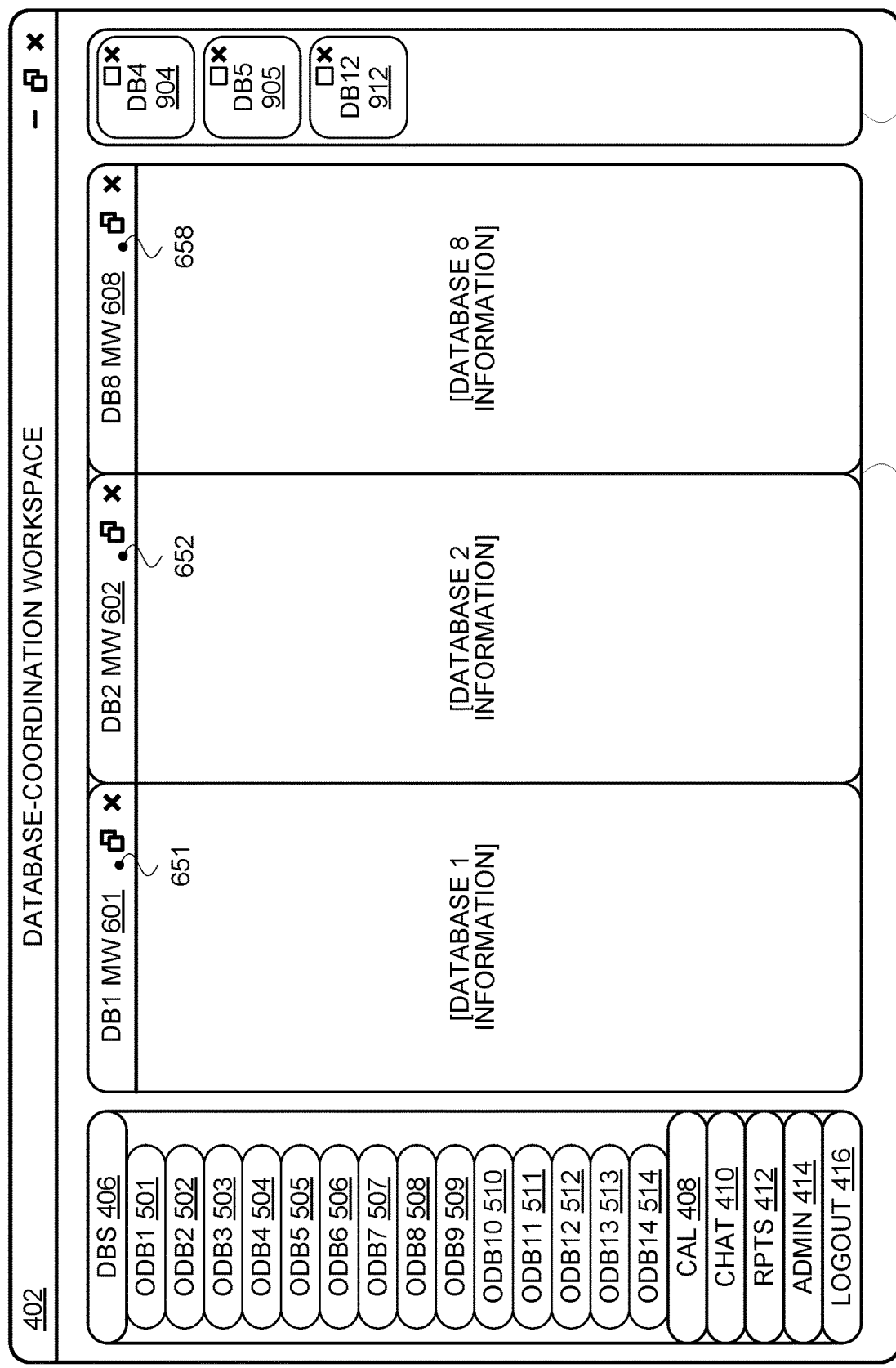
Figure 25:
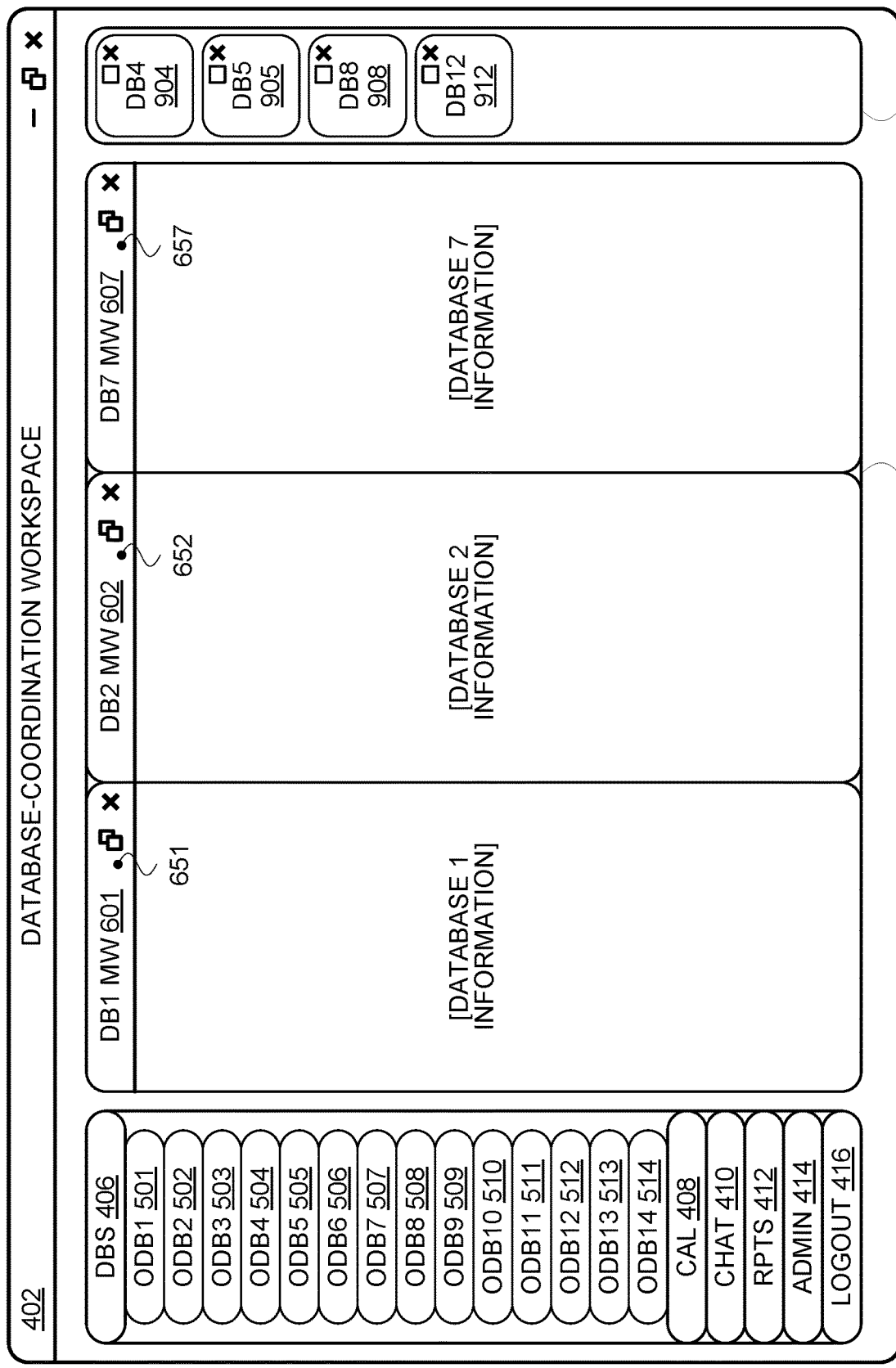

FIG. 24 shows the database-coordination workspace 400 after having received a click in FIG. 16 on the DMW shortcut DB8 908. This results in a swap between DB4 and DB8, with the DB8 DMW 608 taking over the righthand third of the staging area 900, and with the DB4 DMW 604 being minimized to the DMW shortcut 904 in the staging area 900.

FIG. 25 shows the database-coordination workspace 400 after having received a click in FIG. 24 on the ODB7 507, resulting in the DB8 DMW 607 (having a title bar 657) taking over the righthand third of the working area 404, and resulting in the DB8 DMW 608 being minimized to the DMW shortcut DB8 908 in the staging area 900.

Figure 26:
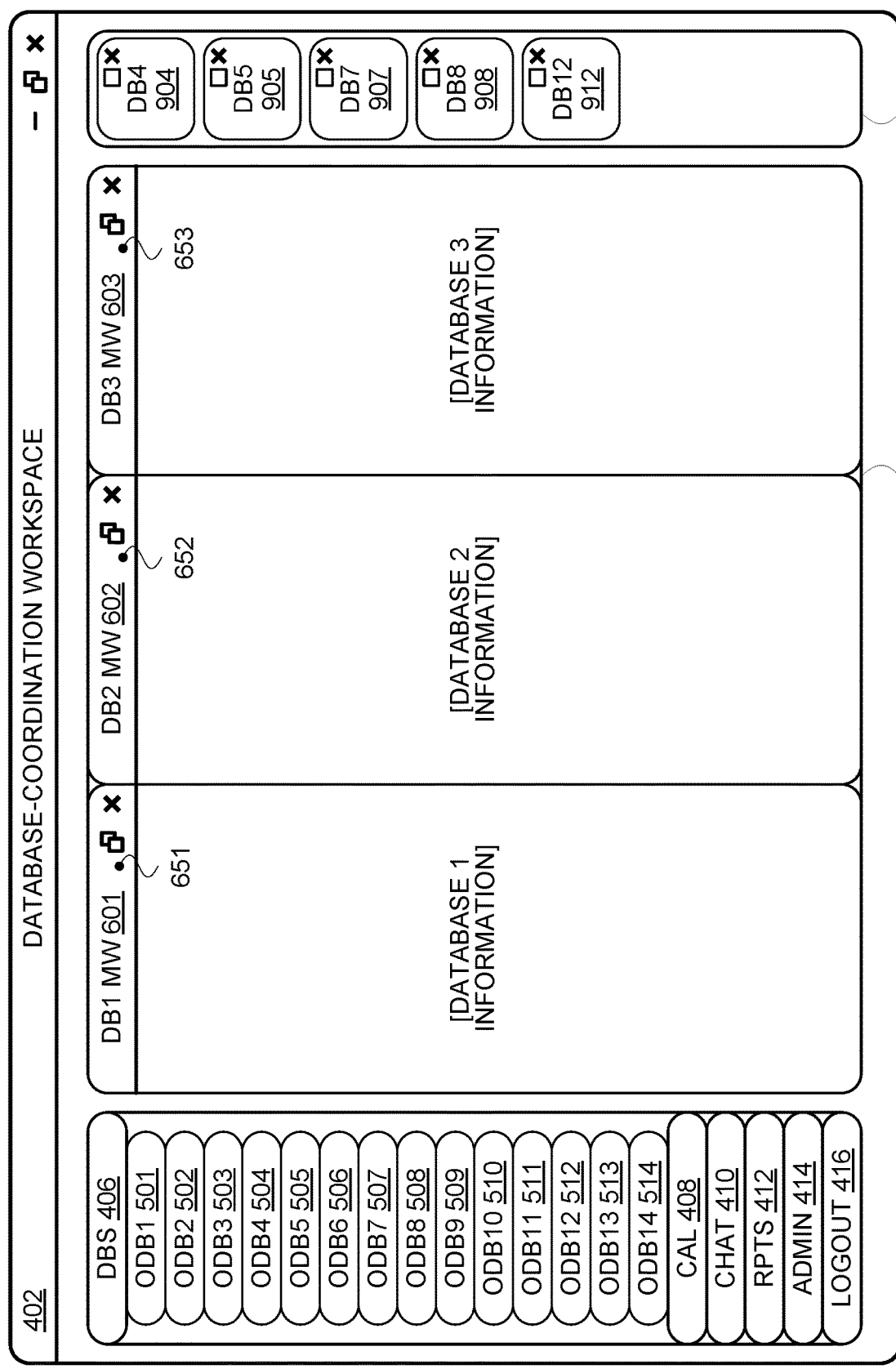

FIG. 26 shows the database-coordination workspace 400 after having received a click in FIG. 25 on the ODB3 503, resulting in the DB3 DMW 603 (having a title bar 653) taking over the righthand third of the working area 404, and resulting in the DB7 DMW 607 being minimized to the DMW shortcut DB7 907 in the staging area 900.

Figure 27:
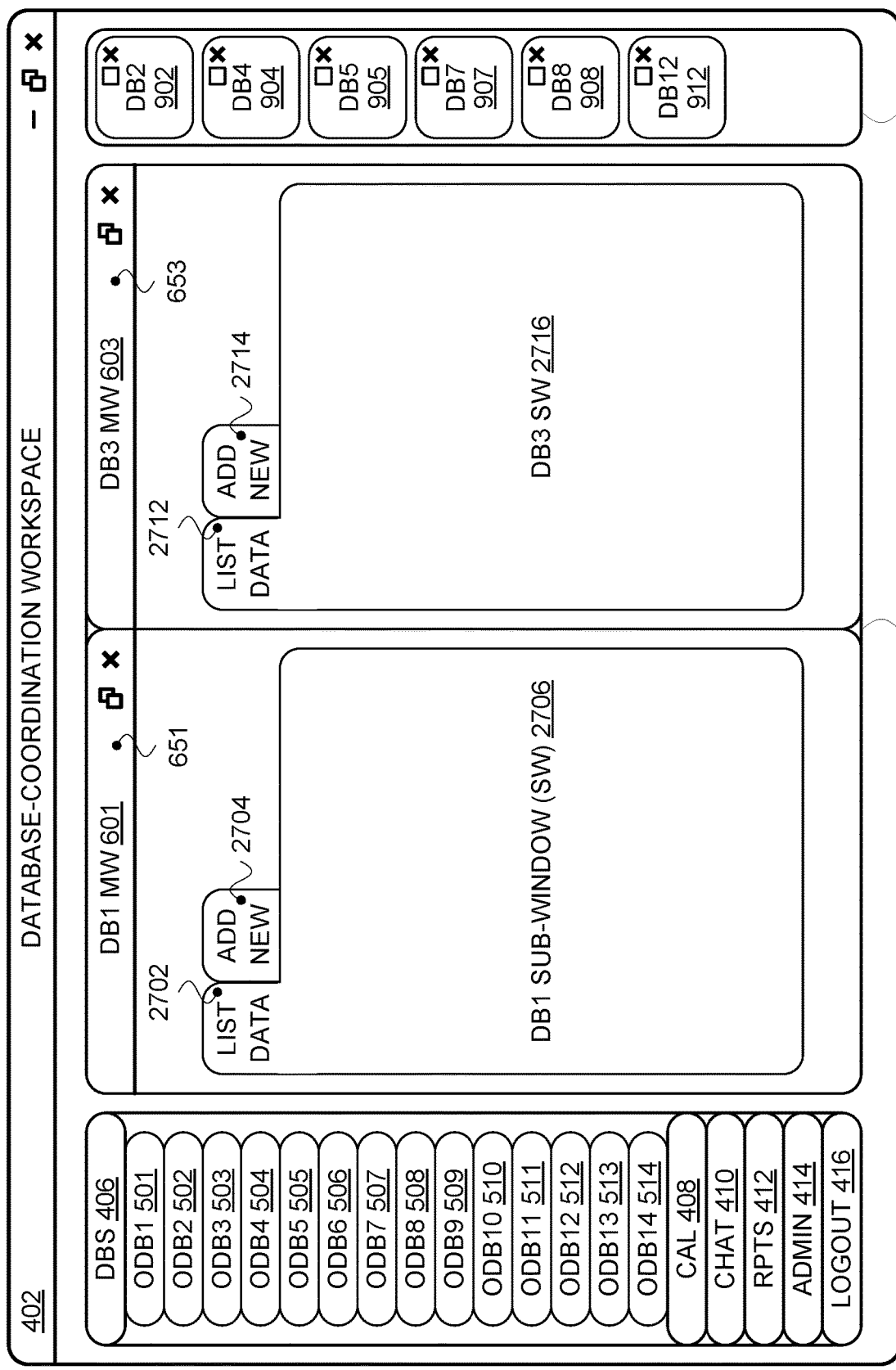

FIG. 27 shows the database-coordination workspace 400 after having received a minimization in FIG. 26 of the DB2 DMW 602, resulting in the DB1 DMW 601 and the DB3 DMW 603 splitting the working area 404, an also resulting in the DB2 DMW 602 being minimized to the DMW shortcut DB2 902 in the staging area 900. Furthermore, FIG. 27 shows the DB1 DMW 601 as including a first tab 2702 called List Data and a second tab 2704 called Add New. The List Data tab 2702 is associated with a first DB1 sub-window (SW) 2706, which is displayed in the foreground in FIG. 27. The Add New tab 2704 is associated with a second DB1 sub-window that is not in the foreground in FIG. 27. Moreover, the DB2 DMW 603 includes a List Tab 2712 associated with a DB3 DMW 2716 that is also displayed in the foreground in FIG. 27, and DB2 DMW 603 also includes an Add New Tab 2714 that is associated with a second DB3 sub-window that is not in the foreground in FIG. 27.

Figure 28:
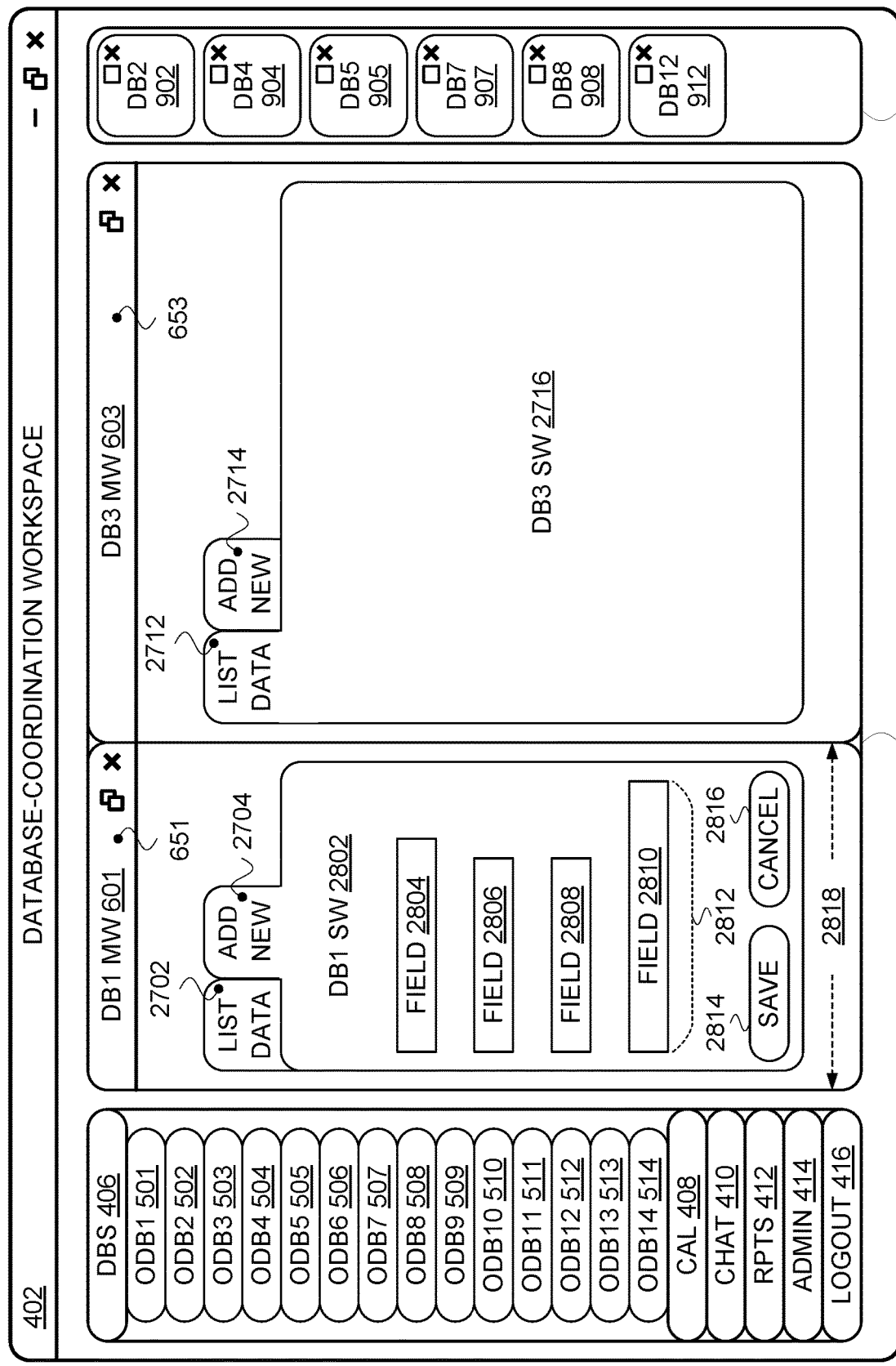

FIG. 28 shows the database-coordination workspace 400 after having received a click in FIG. 27 on the Add New tab 2702 in the DB1 DMW 601. In an embodiment, the Add New tab 2702 can be used to add a new record to DB1, while the Add New tab 2712 can be used to add a new record to DB3. The selection of the Add New Tab 2704 results in foreground display of a DB1 sub-window 2802 that includes a data field 2804, a data field 2806, a data field 2808, and a data field 2810, as well as a Save button 2814 and a Cancel button 2816.

Each of the four data fields 2804-2810 have a certain predetermined display width. The greatest of those belongs to the data field 2810, which has a required field width 2812. As can be seen in FIG. 28, the DB1 DMW 601 has been reduced to a width 2818 to accommodate that maximum required field width 2812 among the fields of the DB1 sub-window 2802, and the remainder of the width of the working area 404 has been allocated to the DB3 DMW 603. This occurs dynamically in response to the user selection of the Add New tab 2704 of the DB1 DMW 601.

Figure 29:
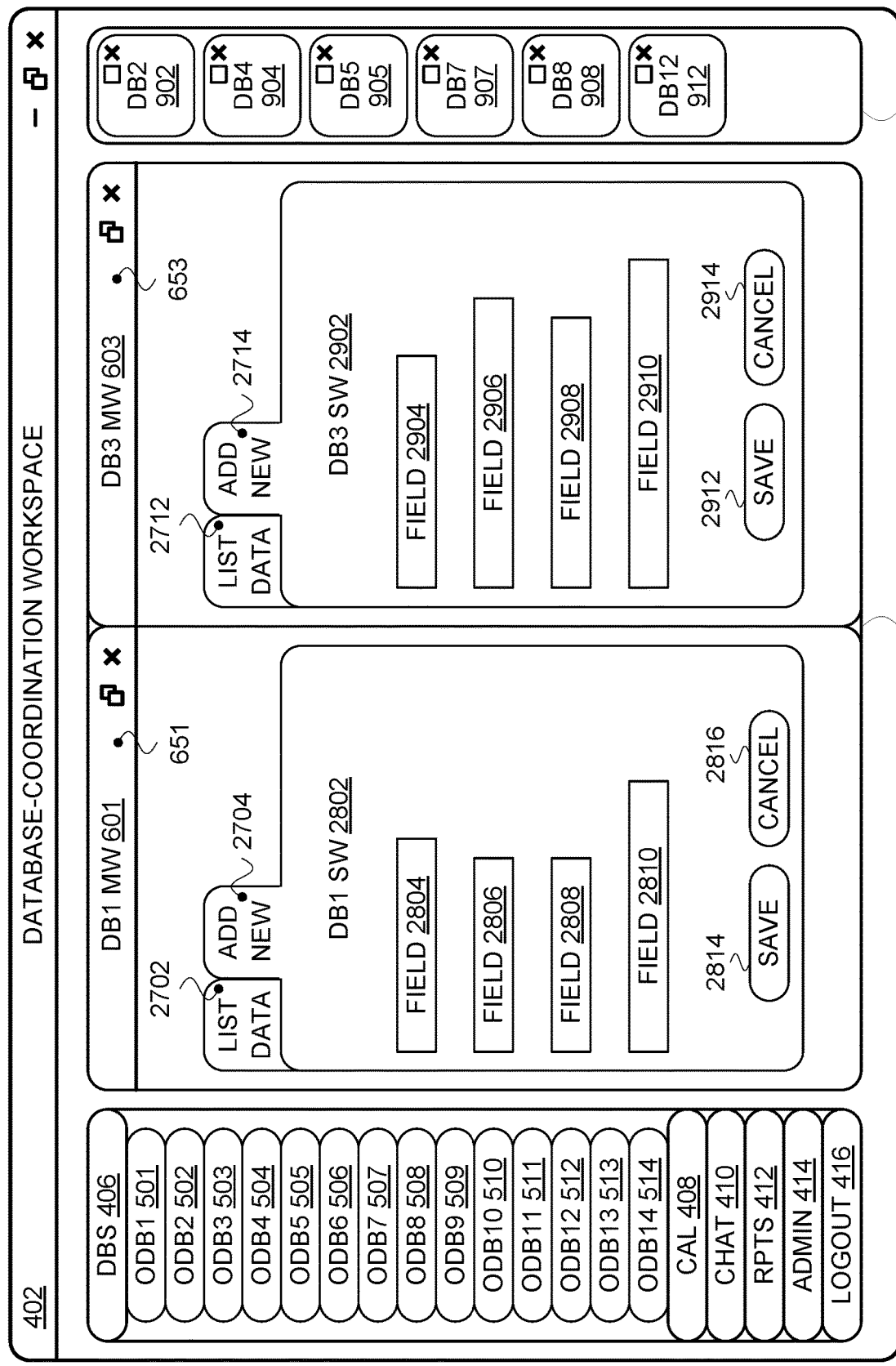

FIG. 29 shows the database-coordination workspace 400 after having received a click in FIG. 28 on the Add New tab 2714 of the DB3 DMW 603. This results in the foreground display of a DB3 sub-window 2902 that is associated with the Add New tab 2714. The DB3 sub-window 2902 includes a data field 2904, a data field 2906, a data field 2908, and a data field 2910, as well as a Save button 2912 and a Cancel button 2914. In response to receiving the user selection of the Add New tab 2714 when the Add New tab 2704 was already selected, the system dynamically evenly splits the available width of the working area 404 between the DB1 DMW 601 and the DB3 DMW 603.

Figure 30:
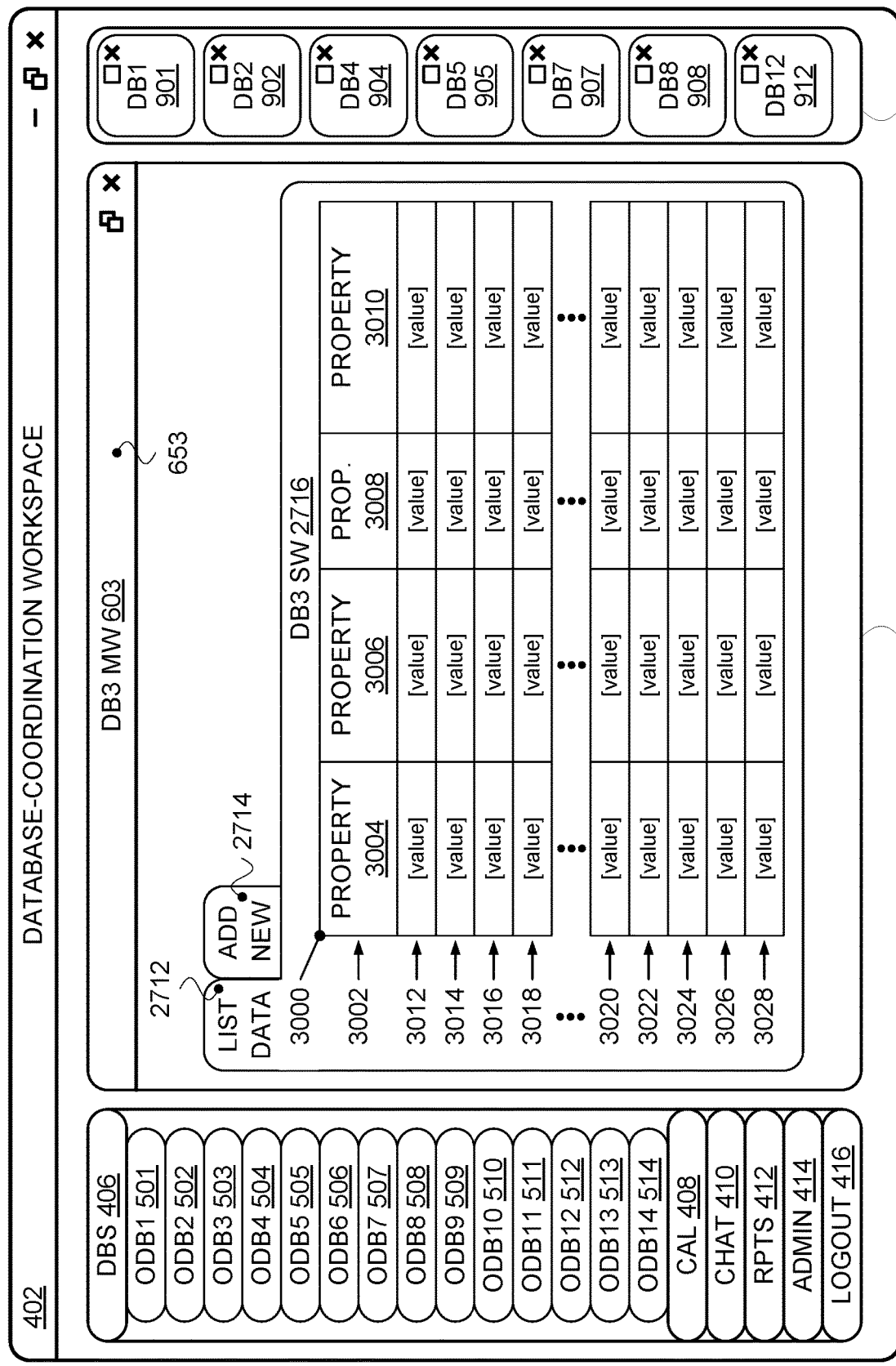

FIG. 30 shows the database-coordination workspace 400 after having received clicks (in either order) that minimized the DB1 DMW 601 to the DMW shortcut DB1 901 in the staging area 900, and that selected the List Data tab 2712 in the DB3 DMW 603. These clicks resulted in display of the DB3 MW 603 occupying the whole working area 404, and furthermore in FIG. 30 additional detail is shown as to what a List Data sub-window looks like in at least one embodiment. The DB3 sub-window 2716 is shown as including a table 3000 that includes four columns for four different data properties 3004, 3006, 3008, and 3010 listed in a header row 3002 of the table 3000. Moreover, data records are represented in rows 3012 through 3028, with vertical ellipses shown therein to indicate that an arbitrary number of records could be stored.

In an embodiment, the database-coordination workspace 400 is used to coordinate law-enforcement investigations, and the databases are interrelated with one another and collectively pertain to a particular law-enforcement investigation at a given time. In an embodiment, instead of the 14 databases described by way of example in connection with most of the herein-described embodiments, the following 28 databases are implemented in connection with various example implementations of the present systems and methods:

1. Addresses
2. Add Requests
3. Arrests
4. Bank Accounts
5. Branding of Drugs

6. Cell Site
7. Coded Words
8. Commercial Flights
9. Credit Cards
10. Drug Transactions
11. Emails
12. Export As
13. Fire Arms
14. Luggage Tags
15. Meta Data
16. Miscellaneous
17. Money Transactions
18. Money Wires
19. Names Mentioned
20. Package Tracking
21. Plane Info
22. Players Involved
23. Private Flight Plans
24. Seizures
25. Subscribers Info
26. Target Info
27. Vehicles
28. Vocabulary Those of skill in the art will appreciate the usefulness of the present systems and methods in connection with law-enforcement investigations that involve databases such as those. In some embodiments, one or more of those databases are linked with one another, such that updates to one automatically result in updates to one or more others. In some cases these are one-way updates (i.e., populations of data), whereas in other cases these updates are two-way (i.e., syncs).

Figure 31:
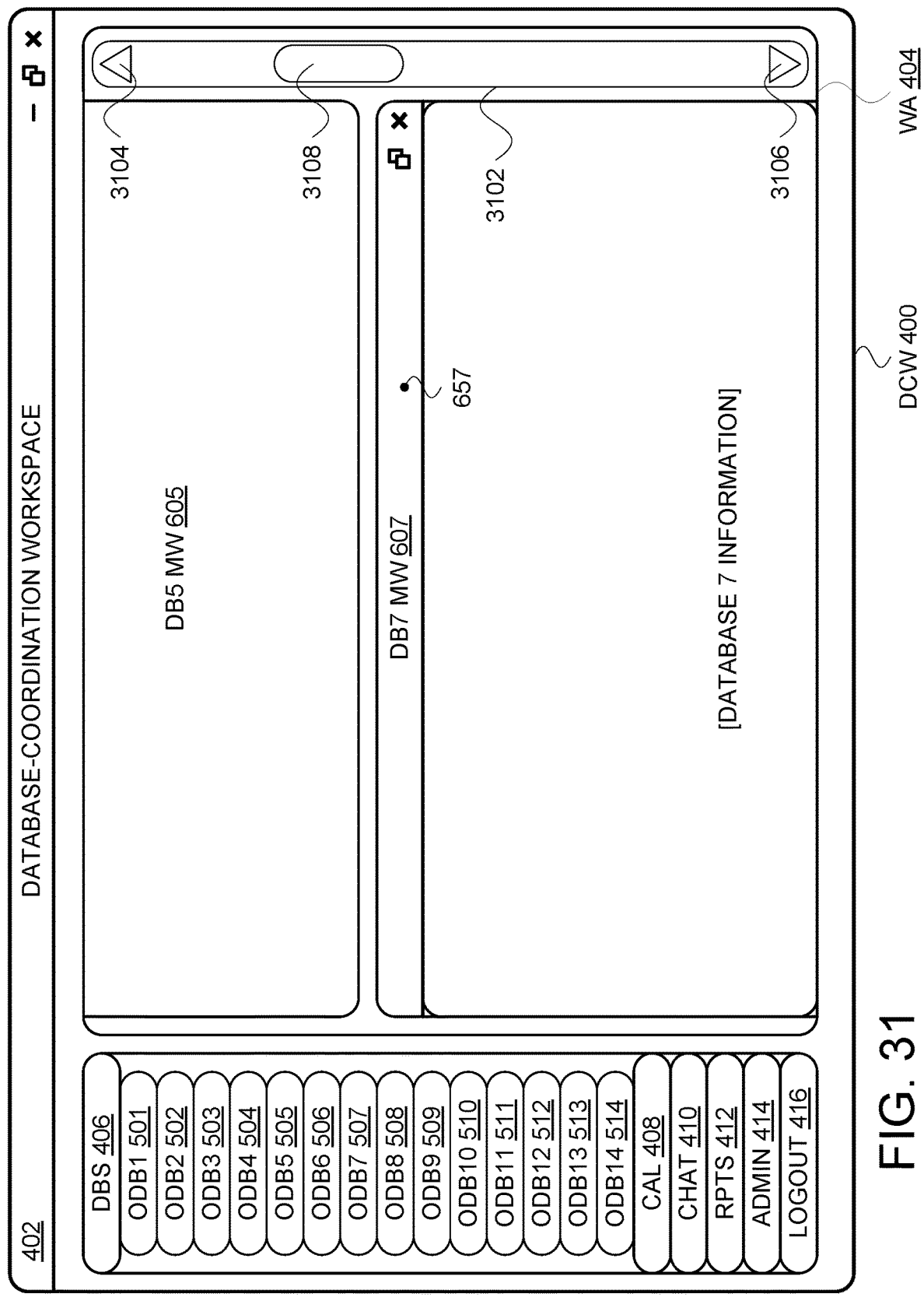

Some additional user-interface features of various embodiments of the present systems and methods are now described below. FIG. 31 (with reference back to FIG. 30) and FIG. 32 depict what is referred to herein as a vertical mode, while the remaining figures, FIG. 33 through FIG. 38 depict and are described in connection with what is referred to herein as the "3-1-4" feature.

FIG. 31 shows the database-coordination workspace 400 after having received a double click in FIG. 30 on the title bar 653 of the DB3 DMW 603. It is also noted that, in the state of the DCW as depicted in FIG. 30, the staging area 900 included the six DMW shortcuts DB1 901, DB2 902, DB4 904, DB5 905, DB7 907, DB8 908, and DB12 912. The double click in FIG. 30 on the title bar 653 of the DB3 DMW 603 results in seven DMWs being depicted in a vertically scrollable arrangement, as depicted in FIG. 31, where a bottom portion of the DB5 DMW 605 and a top portion (including the title bar 657) of the DB7 DMW 607 can be seen.

Also depicted in FIG. 31 is a vertical scroll bar 3102 having a scroll-up arrow 3104, a scroll-down arrow 3106, and a scroll element 3108, all of which can be used to effect vertical scrolling through the set of seven DMWs that from top to bottom includes the DB1 DMW 601, the DB2 DMW 602, the DB3 DMW 603, the DB4 DMW 604, the DB5 DMW 605, the DB7 DMW 607, the DB8 DMW 608, and the DB12 DMW 612. In the embodiment that is depicted in FIG. 31, the working area 404 has been allocated additional room due the removal of the (now-empty) staging area 900.

Figure 32:
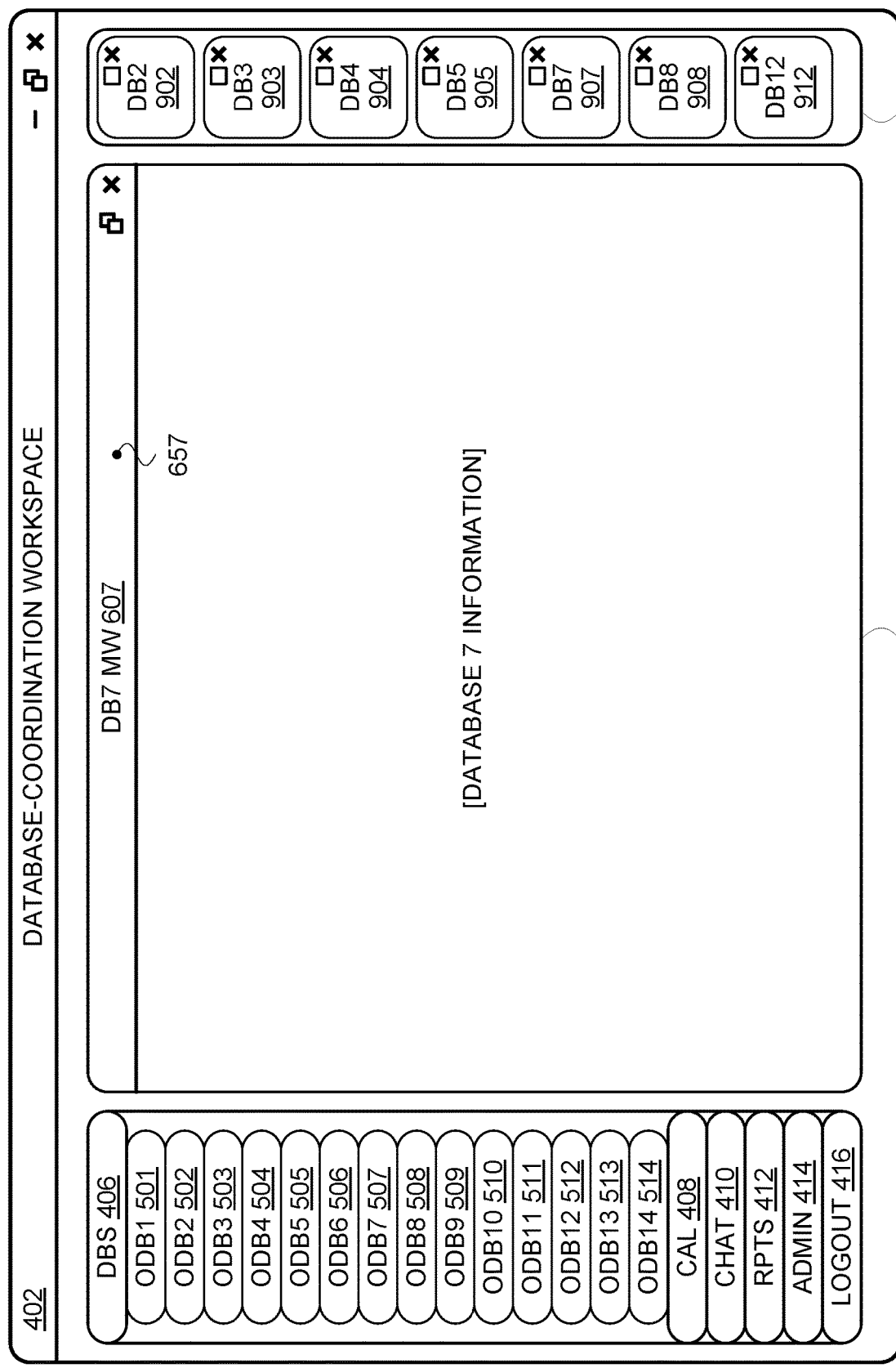
Figure 33:
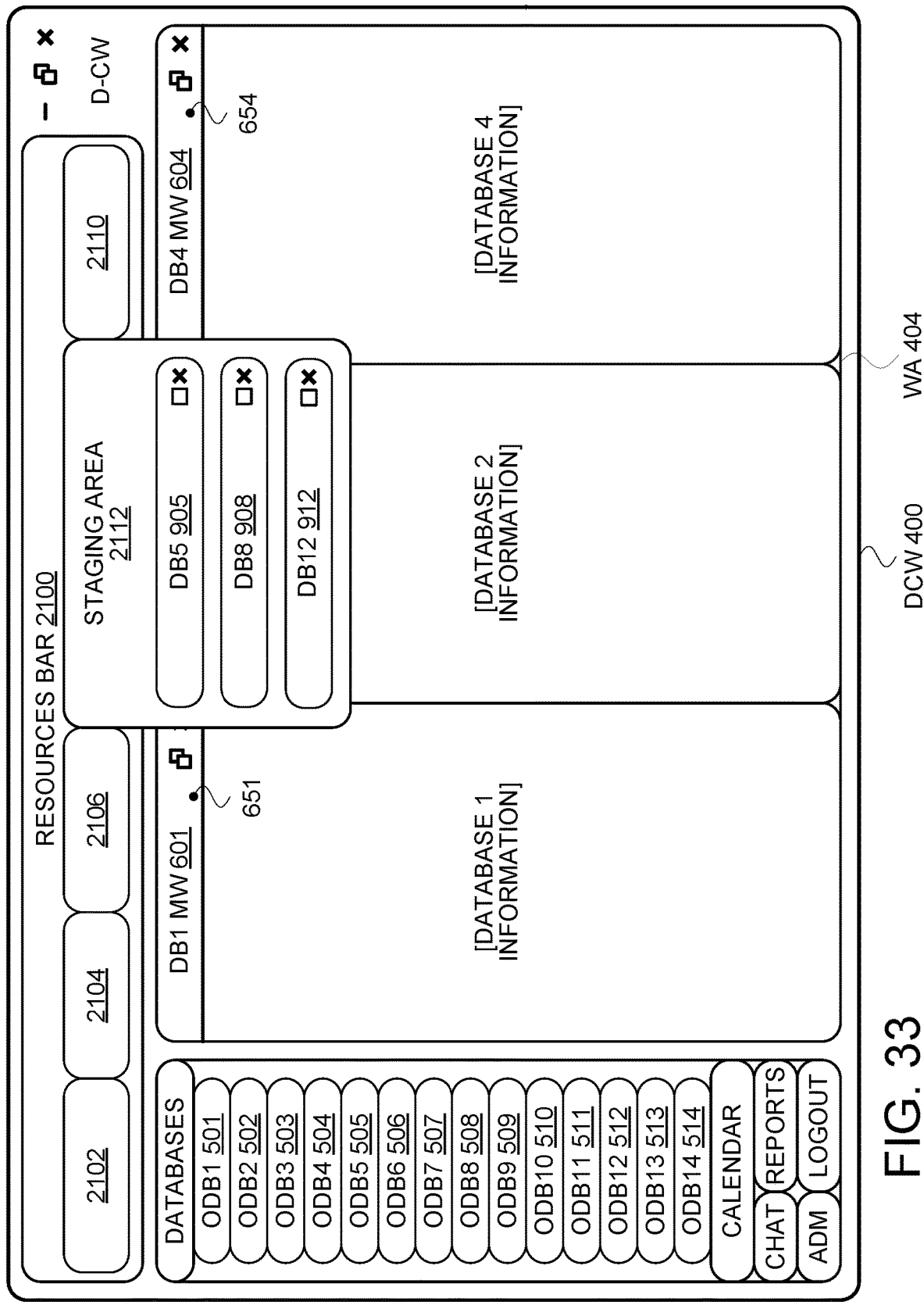

FIG. 32 shows the database-coordination workspace 400 after having received a double click in FIG. 31 on the title bar 657 of the DB7 DMW 607. This results in an exit from vertical mode, and the display of the DB7 MW 607 occupying the entirety of the working area 404. This also results in the return to being minimized in the staging area 900 for the six DMWs other than the DB7 DMW 607 listed in the preceding paragraph. In various embodiments, user inputs other than a double click on a title bar could be used to enter and/or exit from the vertical mode.

FIG. 33 shows the database-coordination workspace 400 in the state that is also shown in FIG. 22. This is the "3" state of the "3-1-4" feature.

Figure 34:
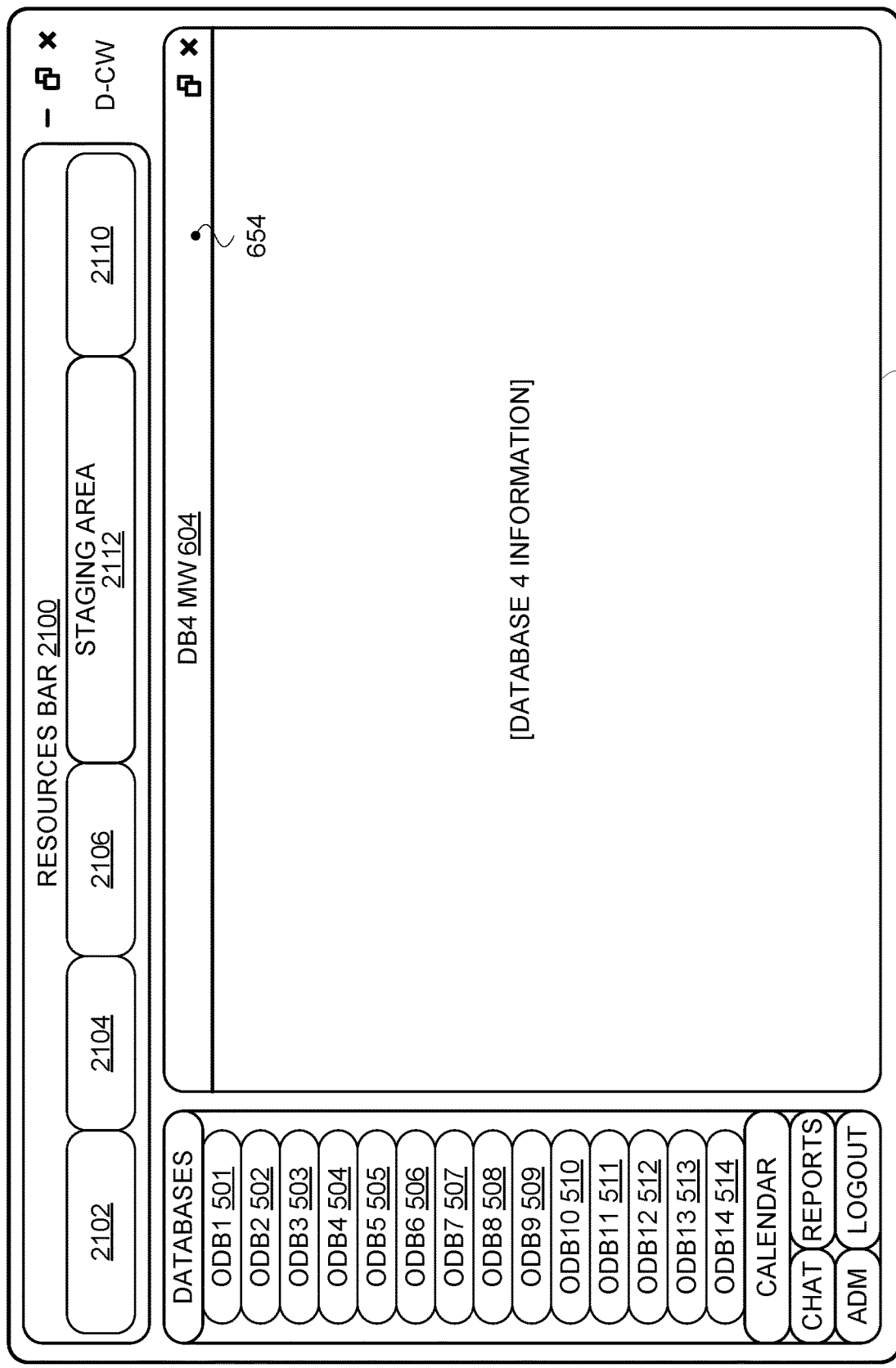

FIG. 34 shows the database-coordination workspace 400 after having received clicks in FIG. 33 to toggle off the display of the staging area 2112, and to minimize the DB1 DMW 601 and the DB2 DMW 602 to the staging area 2112. It is noted that, in FIG. 34, FIG. 36, and FIG. 37, unlike in FIG. 21, the staging area 2112 retains its label in the toggled-off state. This is simply another possible embodiment. Thus, in FIG. 34, the staging area 2112 is toggled off for display (though not empty), and the DB4 DMW 604 occupies the entirety of the working area 404. This is the "1" state of the "3-1-4" feature.

Figure 35:
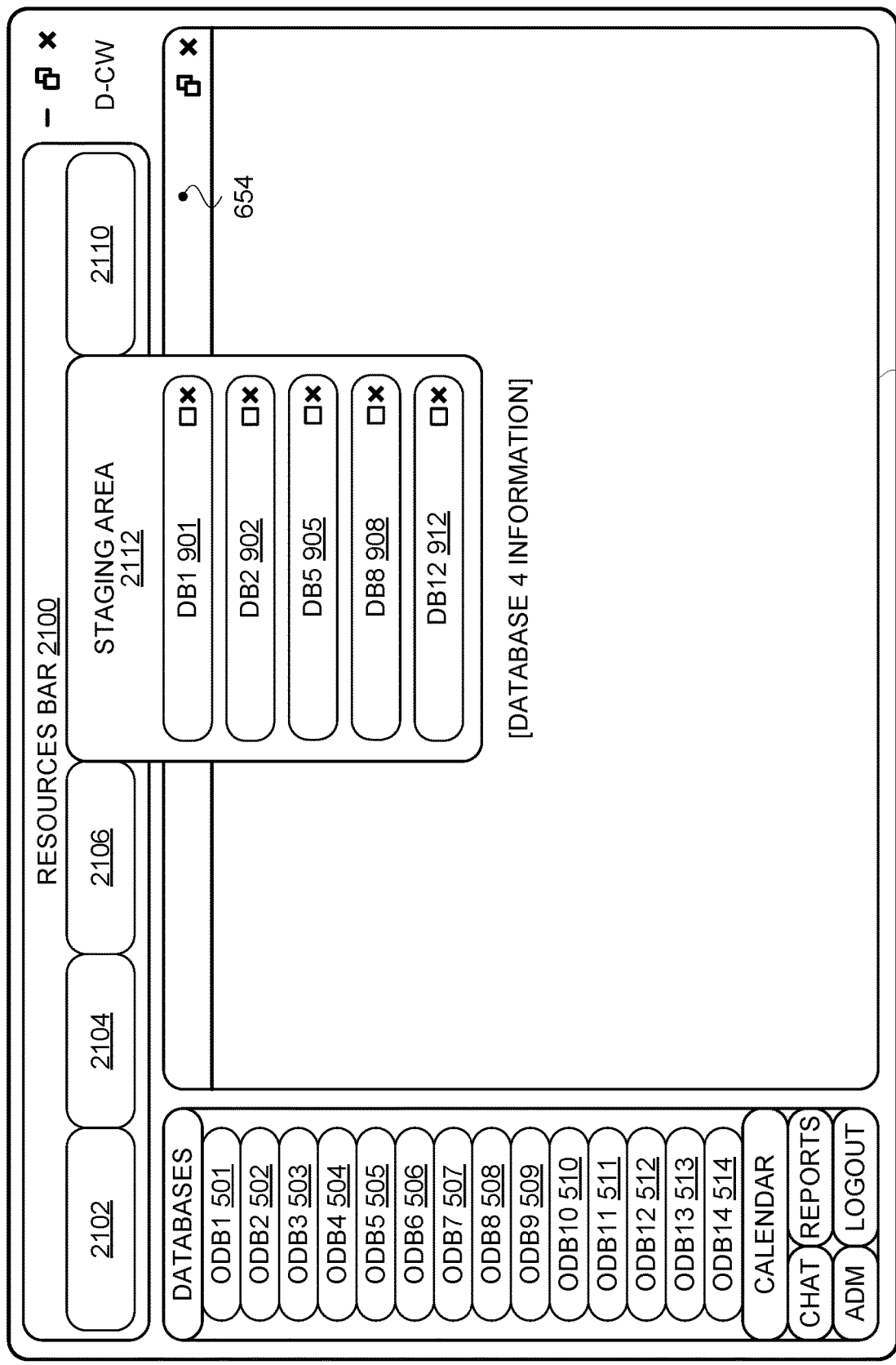

FIG. 35 shows the database-coordination workspace 400 after having received a click in FIG. 34 on the staging area 2114, to toggle the staging area 2112 on for display. It can be seen that there are five DBs minimized in the staging area 2112 into the DMW shortcuts DB1 901, DB2 902, DB5 905, DB8 908, and DB12 912.

Figure 36:
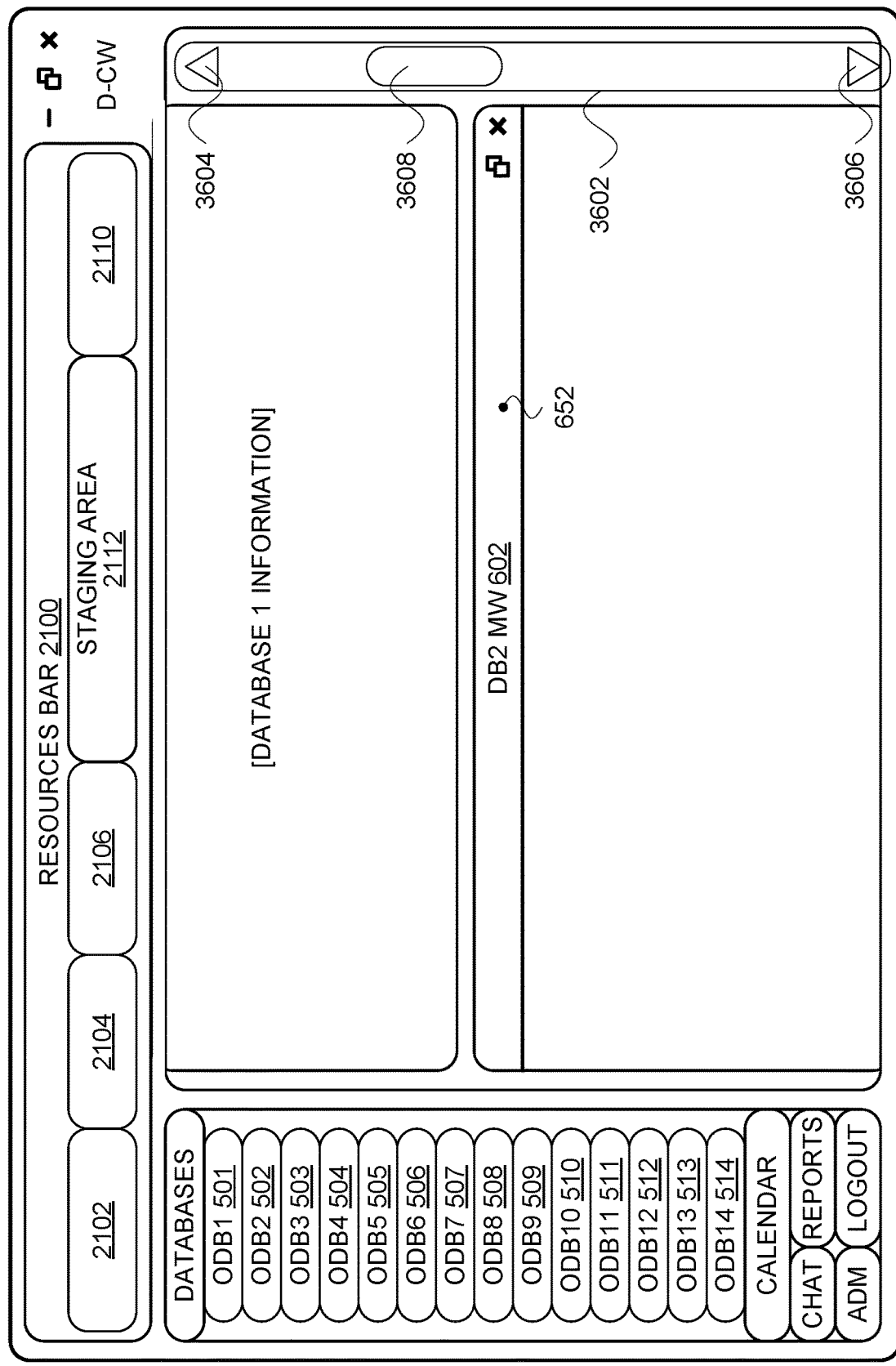

FIG. 36 shows the database-coordination workspace 400 after having received in FIG. 35 a click to toggle the staging area 2112 off for display (which is unnecessary in some embodiments), and then a double click on the title bar 654 of the DB4 DMW 604. This results in a very similar transition as to what occurred between FIG. 30 and FIG. 31. In this case, the five minimized DMWs and the DB4 DMW 604 are all arranged and displayed in a vertically scrollable arrangement. FIG. 36 includes a vertical scroll bar 3602 having a scroll-up arrow 3604, a scroll-down arrow 3606, and a scroll element 3608, all of which can be used to effect vertical scrolling through the set of six DMWs. In FIG. 36, in FIG. 31, where a bottom portion of the DB1 DMW 601 and a top portion (including the title bar 652) of the DB2 DMW 602 can be seen.

Figure 37:
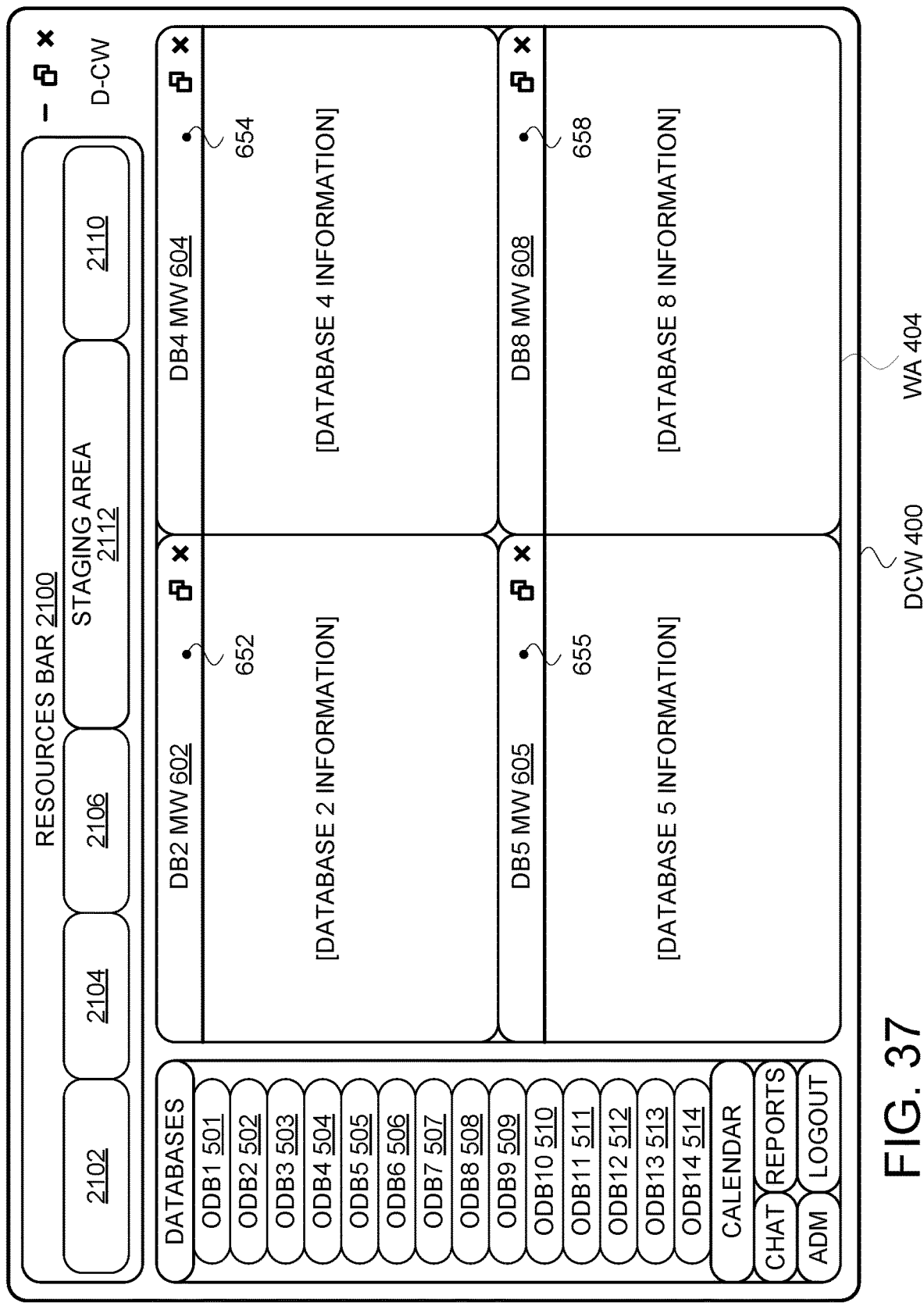

FIG. 37 shows the database-coordination workspace 400 after having received a double click in FIG. 36 on the title bar 652 of the DB2 DMW 602. This results in a display of the "4" state of the "3-1-4" feature. In this four-quadrant arrangement, the upper left is the DB2 DMW 602, the upper right is the DB4 DMW 604, the lower left is the DB5 DMW 605, and the lower right is the DB8 DMW 608.

Figure 38:
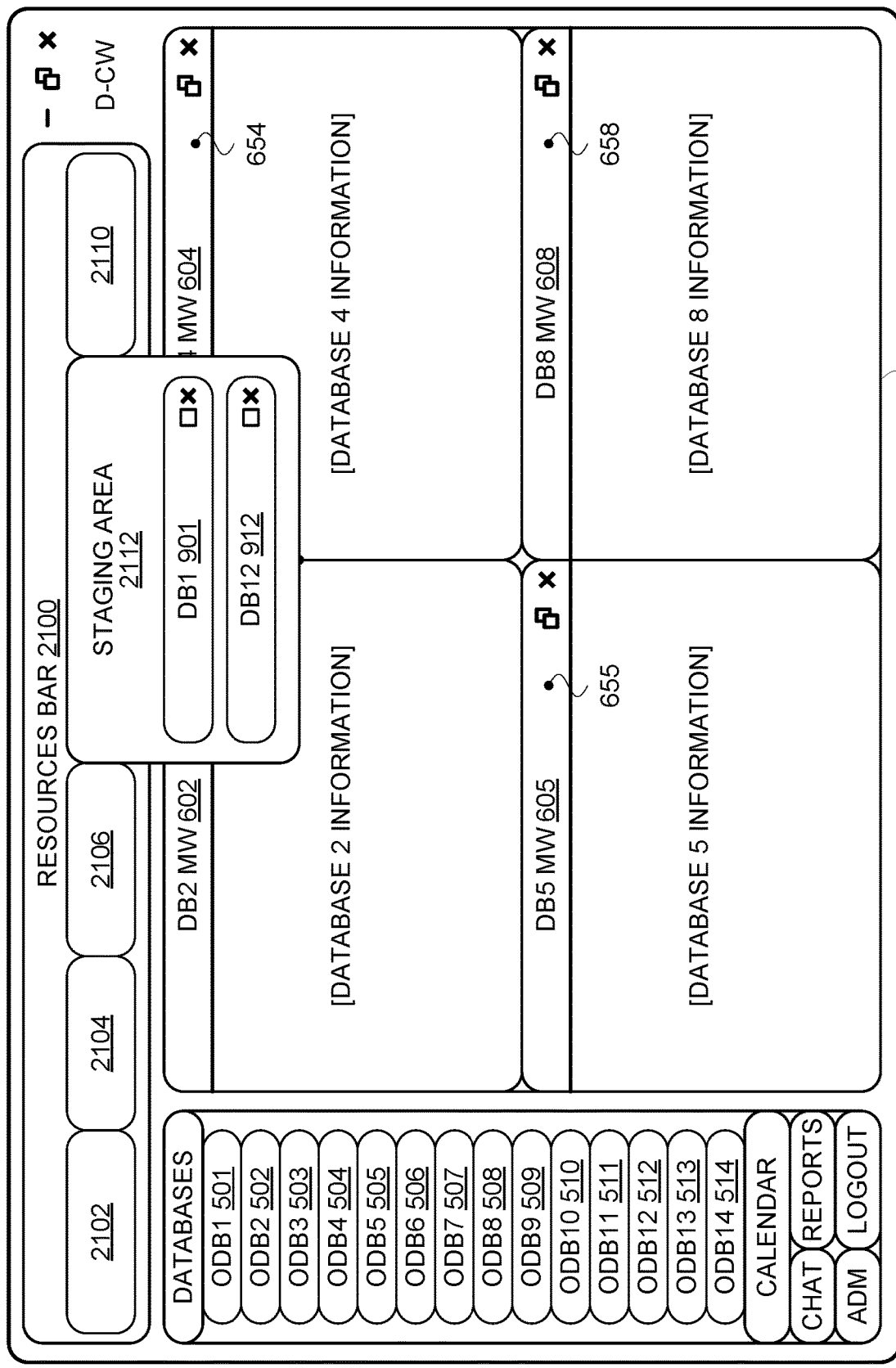

FIG. 38 shows the database-coordination workspace 400 after having received a click in FIG. 37 on the staging area 2112, showing that the other two of the six databases that were displayed in the vertically scrollable arrangement have been minimized to DMW shortcuts in the staging area 2112. In an embodiment, if a user double clicks on any of the title bars of any of the four DMWs shown in the four-quadrant arrangement, the working area 404 will return to displaying three DMWs in the above-described three-column arrangement. Thus, the "3-1-4" cycle can continue. In an embodiment, whichever one of those four the user selects by double clicking on its title bar will be included in the three-column arrangement. In other embodiments, that will be the one that is excluded from the three-column arrangement.

Moreover, while numerous embodiments are described above in connection with managing views of databases in a database-coordination workspace, those of skill in the art will appreciate that the display principles disclosed and claimed herein could be applied to any windows or other display elements on a display screen, whether they be within a given application across multiple applications on an operating-system desktop, embedded modules on a webpage, and/or the like.

What is claimed is:

1. A method comprising:
   displaying, via a user interface of a computing device, a database-coordination workspace that comprises a database-access area and a working area, wherein:
      the database-access area comprises a plurality of selectable database-access elements that each correspond to a different respective database in a plurality of databases, and
      each selectable database-access element is operable to display within the working area a respective database-management window for the corresponding database;
   receiving, via the user interface, selections of the database-access elements, and responsive to each such selection, displaying in the working area a corresponding database-management window,
   wherein, when at least one database-management window is currently displayed in the working area:
      the working area is collectively fully occupied by the one or more currently displayed database-management windows, and
      each currently displayed database-management window initially occupies a predetermined respective fraction of the working area.

2. The method of claim 1, wherein each currently displayed database-management window initially occupies an equal fraction of the working area.

3. The method of claim 1, wherein the predetermined respective fraction of the working area that is initially occupied by a given currently displayed database-management window is different than the predetermined respective fraction of the working area that is initially occupied by at least one other currently displayed database-management window.

4. The method of claim 1, further comprising minimizing at least one currently displayed database-management window as a database-management-window shortcut in a staging area of the database-coordination workspace.

5. The method of claim 4, wherein:
   the database-access elements in the database-access area are displayed in an order; and
   the database-management-window shortcuts in the staging area are displayed in the same order.

6. The method of claim 4, further comprising receiving a user selection of a database-management-window shortcut in the staging area, and responsively displaying the associated database-management window in the working area.

7. The method of claim 6, wherein displaying the associated database-management window in the working area comprises displaying the associated database-management window in a rightmost database-management-window position in the working area.

8. The method of claim 7, wherein the staging area is displayed next to and to the right of the working area on the database-coordination workspace.

9. The method of claim 4, wherein:
   the staging area is not initially displayed on the database-coordination workspace,
   the method further comprising:
      adding the staging area to the database-coordination workspace in response to receiving, via the user interface, at least one of:
         a manual minimization of a currently displayed database-management window; and
         the selection of the additional database-access element when the working-area limit of database-management windows is currently displayed in the working area.

10. The method of claim 9, further comprising dynamically shrinking and re-expanding the working area depending on whether the staging area is currently displayed on the database-coordination workspace.

11. The method of claim 4, further comprising:
    receiving, via the user interface, when (i) exactly one database-management window is currently displayed in the working area and (ii) one or more database-management-window shortcuts are in the staging area, an enter-vertical-mode input via the user interface; and
    responsively entering a vertical mode at least in part by displaying, in the working area, the database-management windows corresponding to that one database-management window and each of those database-management-window shortcuts in a vertically scrollable arrangement.

12. The method of claim 11, further comprising removing the staging area from the database-coordination workspace and commensurately expanding the working area on the database-coordination workspace when operating in the vertical mode.

13. The method of claim 11, further comprising:
    receiving, via the user interface, an exit-vertical-mode input with respect to a particular one of the vertically scrollably displayed database-management windows, and responsively:
       displaying that particular database-management window as the only database-management window currently displayed in the working area; and
       returning each of the other vertically scrollably displayed database-management windows to the staging area.

14. The method of claim 11, further comprising:
    receiving, via the user interface, an exit-vertical-mode input with respect to a particular one of the vertically scrollably displayed database-management windows, and responsively:
       displaying that particular database-management window and three other database-management windows in the working area in a four-quadrant arrangement; and
       returning any other vertically scrollably displayed database-management windows to the staging area.

15. The method of claim 14, further comprising, when displaying the four-quadrant arrangement, receiving, via the user interface, an exit-four-quadrant-arrangement input, and responsively:
    displaying three of the four database-management windows from the four-quadrant arrangement in a three-column arrangement in the working area; and
    minimizing the fourth database-management window from the four-quadrant arrangement to the staging area.

16. The method of claim 14, wherein the exit-four-quadrant-arrangement input is particular to one of the four database-management windows from the four-quadrant arrangement, the method further comprising including that particular database-management window in the three database-management windows in the three-column arrangement.

17. The method of claim 4, wherein the staging area is toggleable with respect to being displayed or not using a staging-area-toggling user-interface element.

18. The method of claim 1, wherein the working area is configured to concurrently display at most a working-area limit of database-management windows.

19. The method of claim 18, wherein receiving, via the user interface, selections of the database-access elements, and responsive to each such selection, displaying in the working area a corresponding database-management window comprises:

receiving, via the user interface when the working-area limit of database-management windows is currently displayed in the working area, a selection of an additional database-access element that corresponds to a database other than the databases for which corresponding database-management windows are currently displayed in the working area, and responsively:
replacing one of the currently displayed database-management windows with a database-management window that corresponds to the selected additional database-access element; and
displaying, in a staging area of the database-coordination workspace, a database-management-window shortcut to the replaced database-management window.

20. The method of claim 19, wherein:
the currently displayed database-management windows are displayed side-by-side in the working area; and
replacing one of the currently displayed database-management windows with a database-management window that corresponds to the selected additional database-access element comprises replacing the rightmost one of the currently displayed database-management windows with the database-management window that corresponds to the selected additional database-access element.

21. The method of claim 1, further comprising:
receiving, via the user interface when at least two database-management windows are currently displayed in the working area, a tab-selection input with respect to a given one of the currently displayed database-management windows, wherein:
the given currently displayed database-management window comprises first and second tabs that are respectively associated with first and second sub-windows of the given currently displayed database-management window,
the first sub-window is initially displayed in a foreground of the given currently displayed database-management window,
the second sub-window is initially not displayed in the foreground of the given currently displayed database-management window,
the first sub-window has a first maximum-data-field-width requirement,
the second sub-window has a second maximum-data-field-width requirement that is less than the first maximum-data-field-width requirement, and
the tab-selection input represents a selection of the second tab;
responsive to receiving the tab-selection input, resizing the at least two currently displayed database-management windows at least in part by:

effecting a reduction in a displayed width of the given currently displayed database-management window to the second maximum-data-field-width requirement; and
increasing a displayed width of at least one other currently displayed database-management window in a manner that in the aggregate is commensurate with the effected reduction in the displayed width of the given currently displayed database-management window.

22. The method of claim 21, wherein, prior to effecting the reduction, the displayed width of the given currently displayed database-management window is based on the predetermined respective fraction of the working area initially occupied by the given currently displayed database-management window.

23. The method of claim 21, wherein:
the second tab of the given currently displayed database-management window is an add-new-record tab;
each of the at least one other currently displayed database-management windows comprises a respective add-new-record tab; and
the method further comprises:
receiving, via the user interface, tab-selection inputs with respect to the add-new-record tab of each of the other currently displayed database-management windows; and
responsively displaying all of the currently displayed database-management windows in equal fractions of the working area, each with their respective add-new-record tab displayed in the respective foreground of the respective database-management window.

24. The method of claim 1, wherein:
the database-coordination workspace is an investigation-coordination workspace; and
the databases in the plurality of databases are interrelated with one another and collectively pertain to a particular law-enforcement investigation.

25. The method of claim 1, further comprising visually indicating in the database-access area which of the databases are currently displayed in the working area, currently minimized to a staging area, and currently neither.

26. A system comprising:
a communication interface;
a user interface;
a processor; and
data storage containing instructions executable by the processor for carrying out a set of functions, the set functions comprising:
displaying, via a user interface of a computing device, a database-coordination workspace that comprises a database-access area and a working area, wherein:
the database-access area comprises a plurality of selectable database-access elements that each correspond to a different respective database in a plurality of databases, and
each selectable database-access element is operable to display within the working area a respective database-management window for the corresponding database;
receiving, via the user interface, selections of the database-access elements, and responsive to each such selection, displaying in the working area a corresponding database-management window,
wherein, when at least one database-management window is currently displayed in the working area:

the working area is collectively fully occupied by the one or more currently displayed database-management windows, and each currently displayed database-management window initially occupies a predetermined respective fraction of the working area.

27. A computer-readable medium having stored thereon instructions executable by the processor for carrying out a set of functions, the set functions comprising:

displaying, via a user interface of a computing device, a database-coordination workspace that comprises a database-access area and a working area, wherein:

the database-access area comprises a plurality of selectable database-access elements that each correspond to a different respective database in a plurality of databases, and each selectable database-access element is operable to display within the working area a respective database-management window for the corresponding database;

receiving, via the user interface, selections of the database-access elements, and responsive to each such selection, displaying in the working area a corresponding database-management window, wherein, when at least one database-management window is currently displayed in the working area:

the working area is collectively fully occupied by the one or more currently displayed database-management windows, and each currently displayed database-management window initially occupies a predetermined respective fraction of the working area.

* * * * *